July 8, 1958 F. J. FURMAN ET AL 2,842,246

RECORD FEEDING DEVICES

Filed Dec. 31, 1954 14 Sheets-Sheet 1

*INVENTORS.*
F. J. FURMAN
T. D. KORANYE
K. E. RHODES

BY J W Armbruster
ATTORNEY

July 8, 1958 F. J. FURMAN ET AL 2,842,246

RECORD FEEDING DEVICES

Filed Dec. 31, 1954 14 Sheets-Sheet 2

INVENTORS.
F.J. FURMAN,
T.D. KORANYE, K.E. RHODES

BY J W Armbruster
ATTORNEY

RECORD FEEDING DEVICES

INVENTORS.
F. J. FURMAN,
T. D. KORANYE, K. E. RHODES

BY J W Armbruster
ATTORNEY

INVENTORS.
F. J. FURMAN,
T. D. KORANYE, K. E. RHODES

BY J W Armbruster
ATTORNEY

July 8, 1958 F. J. FURMAN ET AL 2,842,246

RECORD FEEDING DEVICES

Filed Dec. 31, 1954 14 Sheets-Sheet 5

INVENTORS.
F. J. FURMAN,
T. D. KORANYE, K. E. RHODES

BY J W Armbruster
ATTORNEY

July 8, 1958 F. J. FURMAN ET AL 2,842,246

RECORD FEEDING DEVICES

Filed Dec. 31, 1954 14 Sheets-Sheet 6

INVENTORS.
F. J. FURMAN,
T. D. KORANYE, K. E. RHODES

BY J W Armbruster
ATTORNEY

INVENTORS
F.J. FURMAN,
T.D. KORANYE, K.E. RHODES

BY J W Armbruster
ATTORNEY

*INVENTORS*
F.J. FURMAN,
T.D. KORANYE, K.E. RHODES

BY J W Armbruster
ATTORNEY

INVENTORS.
F. J. FURMAN,
T. D. KORANYE, K. E. RHODES

BY J W Armbruster
ATTORNEY

July 8, 1958 F. J. FURMAN ET AL 2,842,246

RECORD FEEDING DEVICES

Filed Dec. 31, 1954 14 Sheets-Sheet 10

INVENTORS.
F. J. FURMAN,
T. D. KORANYE, K. E. RHODES

BY J W Armbruster
ATTORNEY

INVENTORS.
F. J. FURMAN,
T. D. KORANYE, K. E. RHODES

BY J. W. Armbruster
ATTORNEY

July 8, 1958 F. J. FURMAN ET AL 2,842,246

RECORD FEEDING DEVICES

Filed Dec. 31, 1954 14 Sheets-Sheet 12

INVENTORS
F. J. FURMAN,
T. D. KORANYE, K. E. RHODES

BY J W Armbruster
ATTORNEY

INVENTORS.
F. J. FURMAN,
T. D. KORANYE, K. E. RHODES

BY J. W. Armbruster
ATTORNEY

INVENTORS.
F. J. FURMAN,
T. D. KORANYE, K. E. RHODES

BY J W Armbruster
ATTORNEY 2,842,246

RECORD FEEDING DEVICES

Frank J. Furman, Endicott, and Theodore D. Koranye and Kenneth E. Rhodes, Vestal, N. Y., assignors to International Business Machines Corp., New York, N. Y., a corporation of New York Application December 31, 1954, Serial No. 479,062

11 Claims. (Cl. 197—133)

This invention relates generally to paper feeding devices and more particularly to continuous record form feeding means for operating at high speed in cooperation with a record controlled printing machine.

Related to this parent case are a number of patent applications including Serial No. 568,340, filed on February 28, 1956, by Messrs. Furman, Moneagle, Wetjen and Dowd, for Paper Feeding Mechanism and Retractable Feed Devices; Serial No. 558,247, filed on January 10, 1956, by Messrs. Morgan and Muffley, for a Variable Speed Motor Combined With Tape Feeding Controls; Serial No. 556,748, filed on December 30, 1955, by Messrs. Saltz and Street for Paper Feeding Controls of the Tape Controlled Variety Having a Series of Three Tape Sensing Brushes in the Controls; and Serial No. 586,408, filed on May 22, 1956, by Mr. Kelly for Subcycle Control for Serial Parallel Printer.

With the advent of high-speed printing devices such as the wire printers of the kind with which the present devices are illustrated, it becomes necessary to provide means for advancing record material rapidly and yet without sudden shock of starting or stopping operation. In other words there is required a sort of harmonic feed motion with a slow starting effect, rapid acceleration, and gradual stopping. In the present instance this improved form of movement is brought about by the ingenious use of a variable speed drive motor, a random type of engaging clutch and a perforated feed control tape which in effect gives a preliminary warning when a feed which is about to take place exceeds or falls short of certain spaced limits. The feed control tape is generally of the kind set forth in the Mills et al. Patent No. 2,531,885 and other patents of a similar nature, specifically, 2,569,829, 2,684,746, and application Serial No. 477,286, filed December 23, 1954, by J. M. Cunningham et al., now Patent No. 2,747,717. This present structure is of an advanced form in that in addition to other differences, cooperating with the tape there are three sets of feed control brushes. There are provided the usual set of stop control brushes which sense control indicia or hole posisions in the tape which is synchronized with the movement of the record material, and thereby energize controls for stopping record movement wherever desired. In addition thereto are the other two sets of tape brushes which are forms of predictors engaged by a stop perforation before it reaches the stop brushes. The first set encountered by a perforation are called interlock brushes and they engage a tape perforation 3⅜ inches before it reaches the stop position. Controls are exercised by these interlock brushes for calling the printer back into operation after suppression, and for regulating the amount of time which the printer is held idle to allow time for record material movement. The second set of preliminary brushes are for the purpose of speed reduction, because whenever a skipping movement of the record material is of any appreciable extent the drive motor is driven at a fast speed (75 inches per second as contrasted with 25 inches per second at slow speed) and it is necessary that the speed be reduced before the feed control perforation reaches the stopping control brush. In other words, the second set of preliminary brushes operate motor controls to slow down the carriage movement before it comes to a stop. The result is a harmonic motion which operates through pin feed tractors to draw the continuous form rapidly without tearing the marginal perforations; and the motion is controlled further to come gradually to a stop without shock.

Therefore, it is an object of the invention not only to provide a paper feeding means with a high-speed driving means, but also to furnish controls therefor, so that rapid starting and advance movements and controlled stops are made possible in order to attain variable and fast speeds of record form movement with high-speed printing.

The invention is embodied in a machine of the type having an efficient interlocked paper feeding means for cooperating with a serial order printer. The printer is arranged with one printing head to impress on four adjacent record positions in the manner A B C D
space
H G F E
space
I J K L and in the order A, B, C, D, space, E, F, G, H, space, etc. Multiple printing by each head is accomplished by the lateral motion of the print heads between impressions during the print cycle. The direction of motion is reversed on alternate cycles. In other words, the printer head for printing in four adjacent orders describes a zigzag path relative to the spaced record strip while printing. Therefore, one primary printing cycle is divided into four subcycles, one for each of the four impressions which occur before spacing takes place. For ordinary line spacing operation there is no loss of printer time because printing continues to operate smoothly, character by character. For short skipping or eject operations there is a saving because the printer time taken is in terms of omissions of short subcycles rather than omission of full primary print cycle time. Examples of the minor degrees of loss are given here:

A B C D
4 to 10 or space=4 to 21 line spaces
omit 1 subcycle
omit subcycle E
I H G F
space=22 to 40 line spaces
omit 2 subcycles
omit subcycles J, K
L M N O
space=41 to 58 line spaces
omit three subcycles
omit subcycles P, Q, R
V U T S
space=59 to 77
omit 4 subcycles=1 primary print cycle
omit subcycles W, X, Y, Z
A B C D From the foregoing it is noted that loss of printer time is not invariably large as in the prior art, but rather tailored to suit the particular extent of feeding movement. There is no more loss of time than necessary.

Although shown and discussed in connection with serial order printing with four impressions made on one line from one printer head per main print cycle, it is apparent that speed of printing and feeding may be increased by providing more printer heads and making fewer or no serial order impressions, i. e., twice the speed with only two serial impressions and four times the speed with no serial impressions but a solid array of printer heads with one head for each ordinal position. The speed of recording is of the order of 800 to 1,000 lines per minute for the printer with two serial impressions. It will be realized that many advantages of the construction revealed here are applicable to all forms of printers with or without serial order printing and at speeds greater or less than 1,000 L. P. M.

Another object of the invention is the provision of improved means for performing line spacing of single, double, and triple spaces, also long feeding means for short skip and long skip operations to predetermined item and heading start lines, and total positions on successive forms, and overflow control means to perform whenever the number of items require more than one form for recording a complete related group. The perforated feed control tape, the three sets of brushes and electronic circuits controlled thereby, govern the operations of the long feeding means for skipping and overflow operations. The line spacing means is controlled by a commutator and three brushes cooperating therewith and so arranged that one brush is directly on a segment of the commutator, a second brush is spaced one interval removed from a segment and a third brush is spaced two intervals removed from a segment. The segments and brushes of the line space control are arranged to have a flexible roving control whereby any one brush may be the one contacting or removed one or two intervals from a segment at random. The circuits through the line space control brushes are connected to electronic devices for high-speed control of a magnetically controlled start and stop type of random clutch. This clutch is of a mechanical nature capable of high-speed reactions when controlled by a pair of magnets for engaging and disengaging operations.

Another object of the invention is the provision of an advanced form of positive feeding means for handling records of the multiple ply continuous form variety having marginal feed control perforations. The forms are transported by pairs of tractor pin feed chains which are driven through a random clutch and aided in stopping by a magnetic brake. The tractors are arranged in pairs, one pair below a platen and the printing line and another pair above the printing line whereby a secure hold is maintained on the webs of record material as they are transported at high speed. Novel forms of clamping arrangements are provided for keying the tractors on drive shafts and also for holding the driving chains in desired lateral positions.

There are provided paper feeding controls for a variable speed motor so that when it is predetermined that the feed is to be of an extent longer than 9 line spaces, the motor connections are shifted to a higher armature potential but with limiting controls. Although mentioned as a two speed motor it will be realized that the motor, in accelerating or braking between the speed levels, will have varying speeds which tend to produce a harmonic motion with gradual changes even though they occur rapidly. The feed controls select the change in condition of the motor from a slow drive to an accelerated drive and up to a top speed limit condition. As a preliminary to feed stoppage the feed controls select two stages of motor braking or "slow-down" to the normal slow speed drive.

The machine in which the invention is embodied has record advancing means and tape feed control devices with several successively engaged sensing brushes arranged to predict the length of skipping operations and coordinated with the variable speed motor to predetermine the desired rate of speed for each section of the feeding cycle. The advantages of rapid feeding are further advanced by the use therewith of the random clutch which is instantly available for engaging or disengaging the feeding means at any instant in the cycle of operation.

The machine in which the invention is shown involves the design of the feed device to be movable or retractable for ease of assembly of the record material therein and also for servicing. The feed device is mounted on a separate frame with a pair of extending slide rods which pass through holders in the printer frame. The slide rods are long enough to allow retraction of the feeding means over a distance of several inches so that the record holding tractors and platen which are normally spaced close to the printer heads may be drawn away far enough to allow manipulation of the record material over the feeding pins and access given to the feeding devices in general for repair and servicing. A unique form of connecting means is provided between the printer frame and the retractable feeding devices. The two units are held together with heavy latches and these latches are operated eccentrically so that there is a gradual release of the latching instrumentalities when it is desired to separate the two units. In connection with the latching means there is involved another feature of the invention which is provided to allow adjustment for various thicknesses of the record material which may vary from one ply to a substantial number of copies. In order to allow for thickness of the material, the latching block which normally holds the two units very closely spaced may be operated through an eccentric with a manipulative knob so that the connection between the two units is loosened or shifted relatively so that they are joined with a larger amount of spacing between them.

The illustrative machine has a means for shifting the record material slightly longitudinally so that the printing line may be made to coincide with prearranged block positions of the record material. This is done by the manipulation of a worm gear and worm wheel arrangement in the driving connections and interposed between the driving clutch and the feeding tractors. In the normal operation of the device the helical ridges of the worm gear are used as a planetary driving tooth in cooperation with a driven sun gear. When a slight adjustment is to be made, a vernier knob is turned and rotates the worm gear slightly for relative displacement.

The illustrative machine discloses means for automatically untilting the lower pair of feed tractor when the feeding device is retracted to an open position. These lower tractors are normally in a backwardly slanted position and would be difficult to reach were they not pivoted and allowed to swing to a vertical position when the unit is retracted.

The illustrative machine includes improved electronic storage and programming means for the feed control devices. As is customary with the feed control by a tape, the tape is arranged with a plurality of longitudinal channels wherein perforations appear usually arranged diagonally for the various stopping positions arranged progressively along a form. For example, the stopping positions for a head space, the first item, and the first total may be controlled by three holes, the first of which is in channel 1 of the tape, the second is farther along in channel 2 and the third is in channel 3. In the present instance the tape control is further complicated by the desire to detect when a long skip is about to take place and to have such information on hand in connection with each of a plurality of channels, any one of which may be selected according to the arrangement of record cards in the printing tabulator and the control therefrom. As the control tape perforations pass the brush stations each channel operates electronically to set up a reading of its skipping distance by positional thyratrons. For example, even if no skips are called for but the record is continually spaced, the thyratrons for channel 1 would react as follows: The first thyratron is energized from the interlock brush which will be recalled as the first brush encountering the perforation. The second thyratron is energized from the "slowdown" brush which will be remembered as the intermediate brush. When the second thyratron is energized it puts out the first one. The third thyratron is energized from the stop brush which is the last one reached by the hole in channel 1, and it in turn puts out the other two thyratrons before going out itself. This cycle is repeated and a similar electronic cycle is provided for each channel. The reason for this form of electronic program or storage arrangement is that if at any time a skip to 1 is called for and it is found that the first thyratron is energized, connections are already established thereby and it is known that the length to be skipped is less than 3⅔ inches and requires no extra loss subcycles, but since the second thyratron is ineffective it is evident that the skipping distance is more than a short interval and it is evident that a high-speed start is called for. From the foregoing it is apparent that when the printer signals the paper feed devices for skipping under the control of a certain channel, that is for a skip to a heading, an item line or a total line, the distance to be covered in connection therewith is immediately detected because of the condition of the three related thyratrons, which in effect signal the starting point and the amount of distance of the skip which is about to take place. All this adds up to a saving in time and the possibility of actuating fast electronic controls for varying the speed of the drive motor and the clutching and declutching of the drive connections.

Another object of the invention is the provision of electronic devices for governing feed control in cooperation with an electric switch set in accordance with the known length of each form on a continuous strip. The form length selector is arranged with three positions in which the first position is for form lengths in excess of 3⅔ inches (usually 20 line spaces). When the switch is on the second position, the form is between 3⅔ inches and 9 line spaces in length and the third position is indicative of forms shorter than 9 line spaces. This form length switch is a kind of predictor for aiding the speed control device to readily determine how changes between high and low speed operation are to be carried on even before the printer sets up a demand for spacing or skipping control.

Other objects of the invention will be pointed out in the following description and claims and illustrated in the accompanying drawings, which disclose by way of examples the principle of the invention and the best mode which has been contemplated for applying that principle.

Figure 6A:
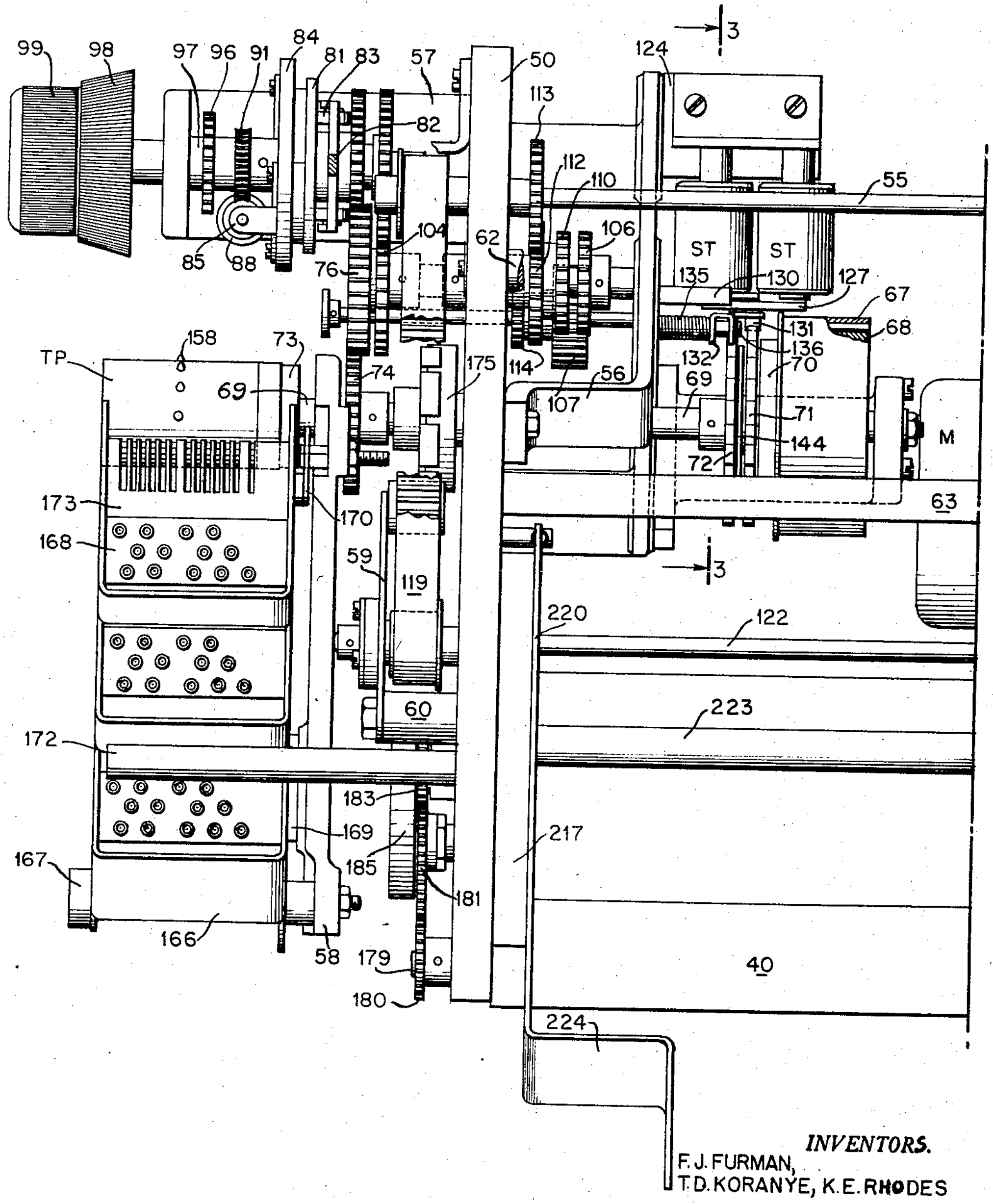
Figure 6B:
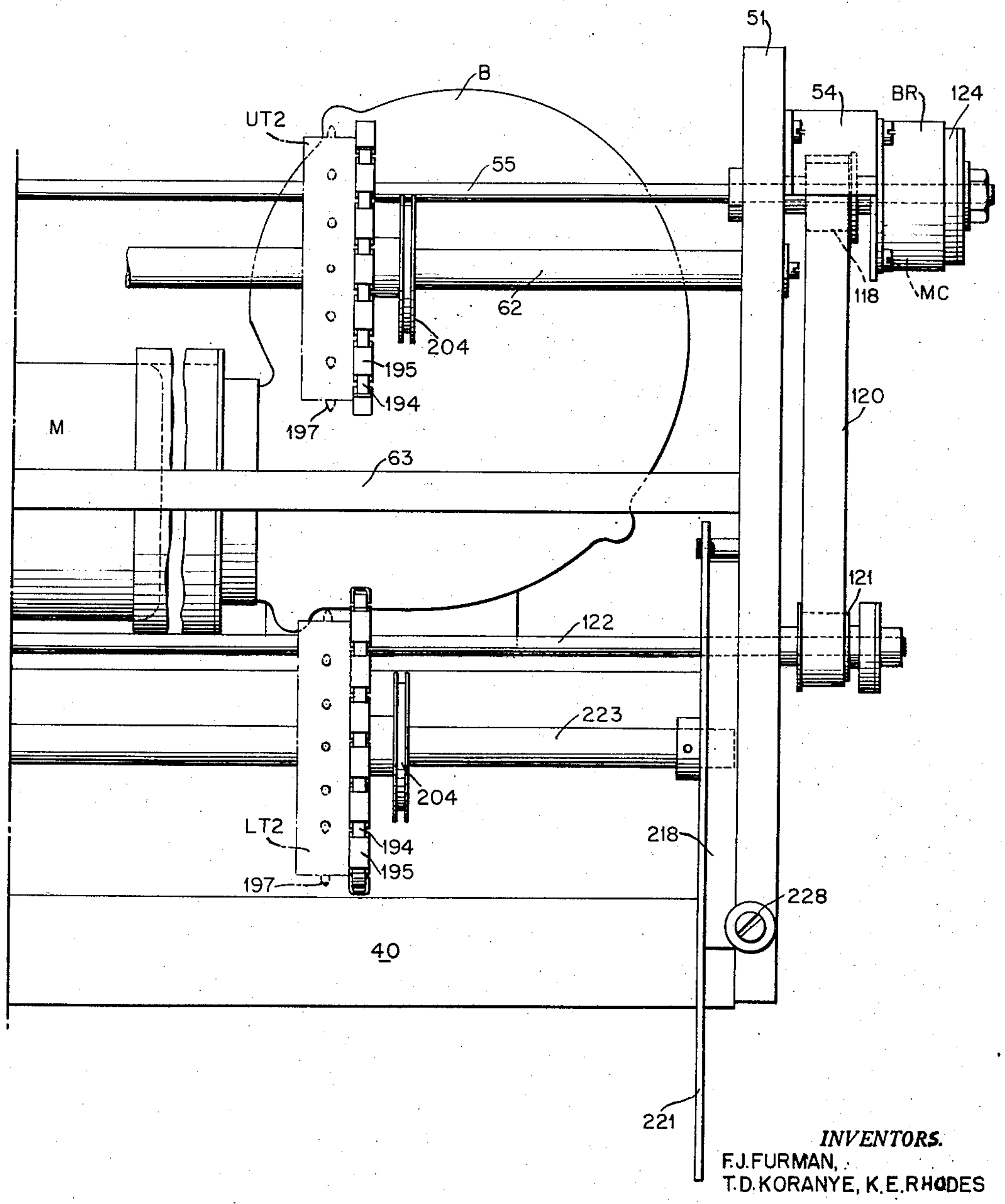

Figs. 6*a* and 6*b* when taken together provide a front elevation view of the entire width of the paper feed unit.

Figure 2:
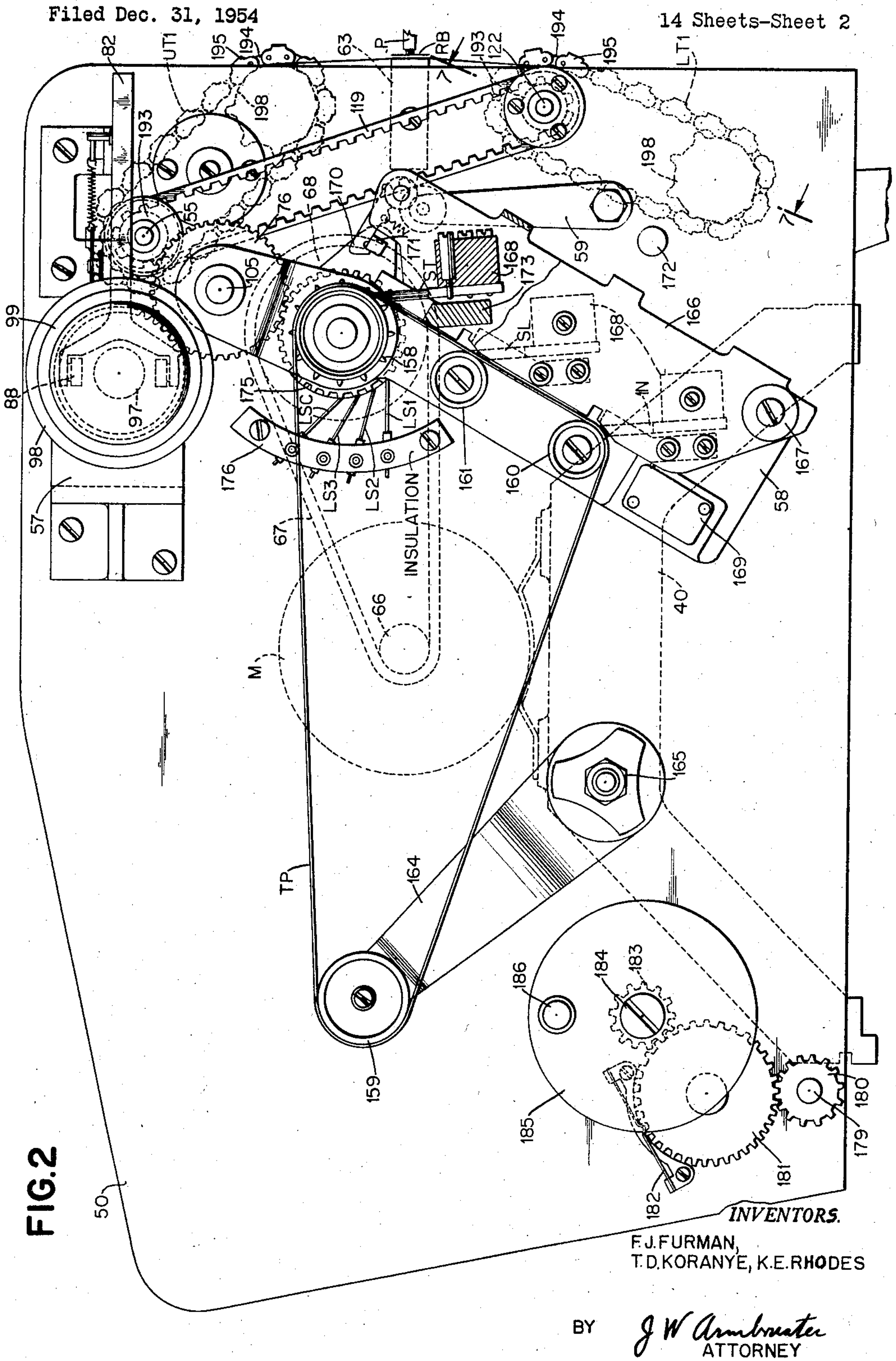
Fig. 2 is a left side elevation view showing the control tape and the three cooperating sets of control brushes. This view also illustrates the mounting of the drive motor and the connections therefrom to the pairs of tractor pin feed devices.
Figure 7:
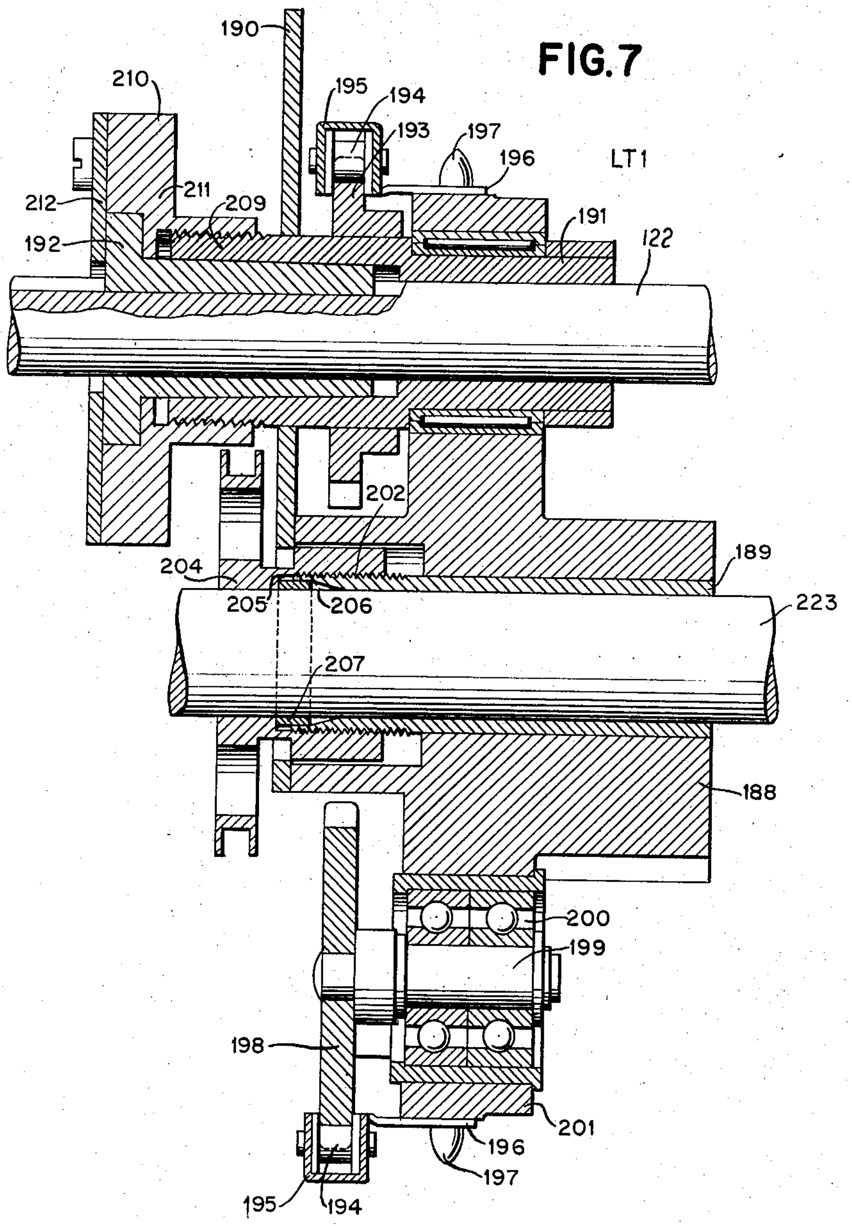

Fig. 7 is a sectional view taken along line 7—7 in Fig. 2 and showing the interior construction of one of the four tractor pin feed devices. This view illustrates the wedging action of a ring for clamping the unit in a lateral position to take continuous forms of a specified width. The view also shows the manner of keying the tractor drive sprocket to the drive shaft.

Figures 8, 9:
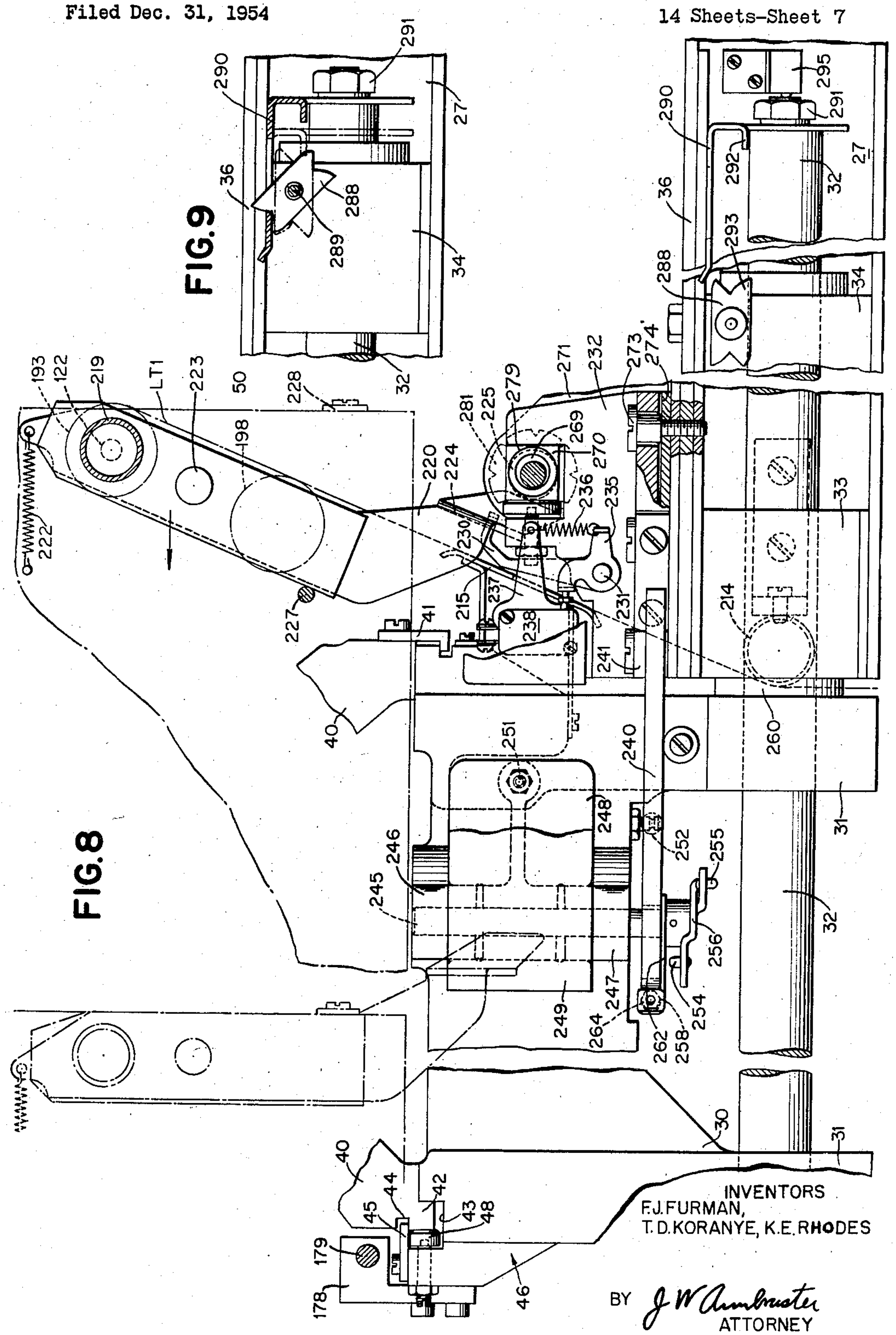

Fig. 8 is a side elevation view showing the latching means for connecting the paper feed unit to the printer and the means cooperating with the lower pair of tractor devices for tilting them when the feed unit is brought into the print receiving position.

Fig. 9 is a detail view in side elevation showing the latching device for holding the feed unit when it is drawn outward away from the printer and into a retracted position.

Figure 10:
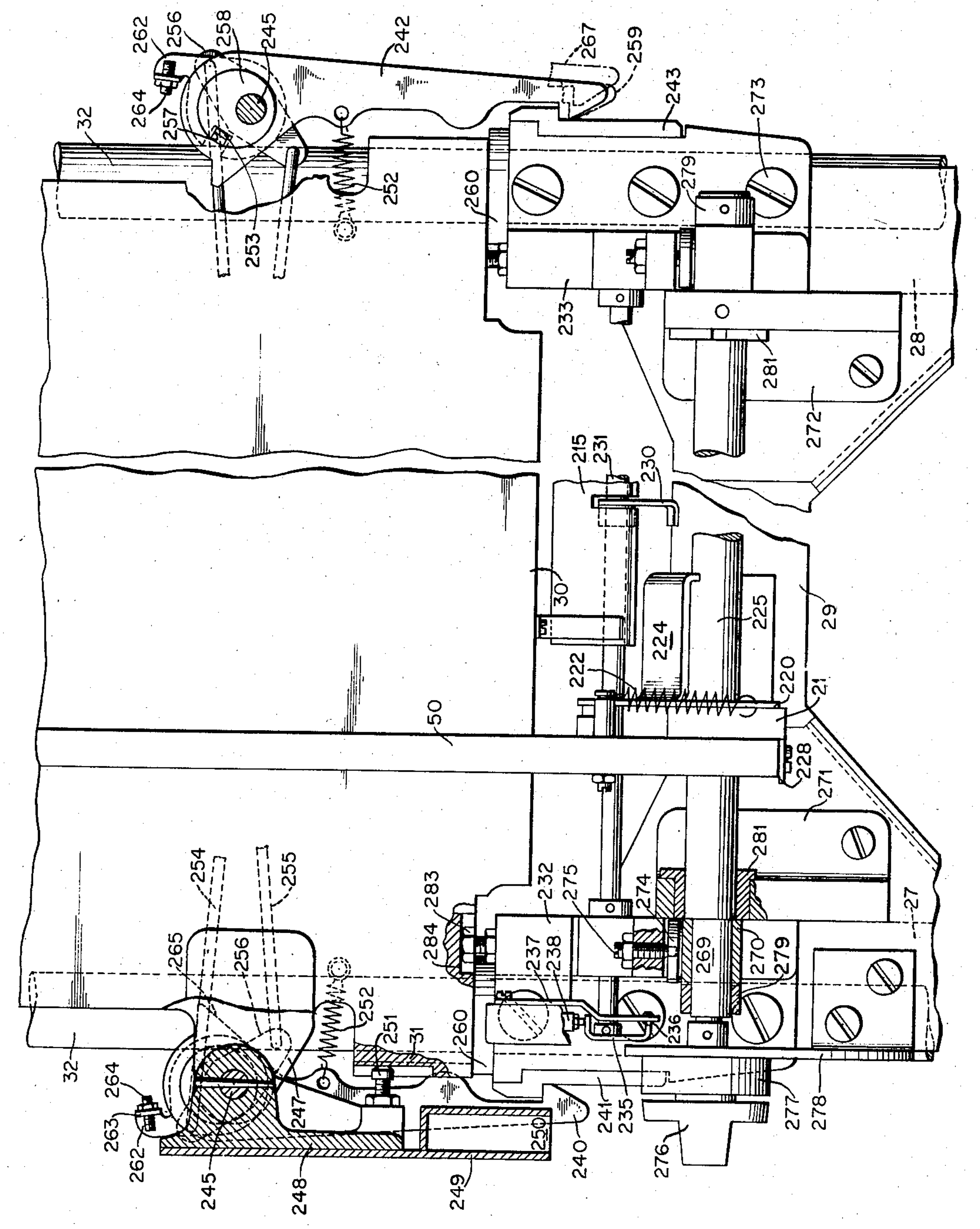

Fig. 10 is a plan view of the latching devices shown in Fig. 8 and further illustrates the manipulative eccentric controls for varying the latch plate positions in accordance with desired paper thickness selection.

Figure 11:
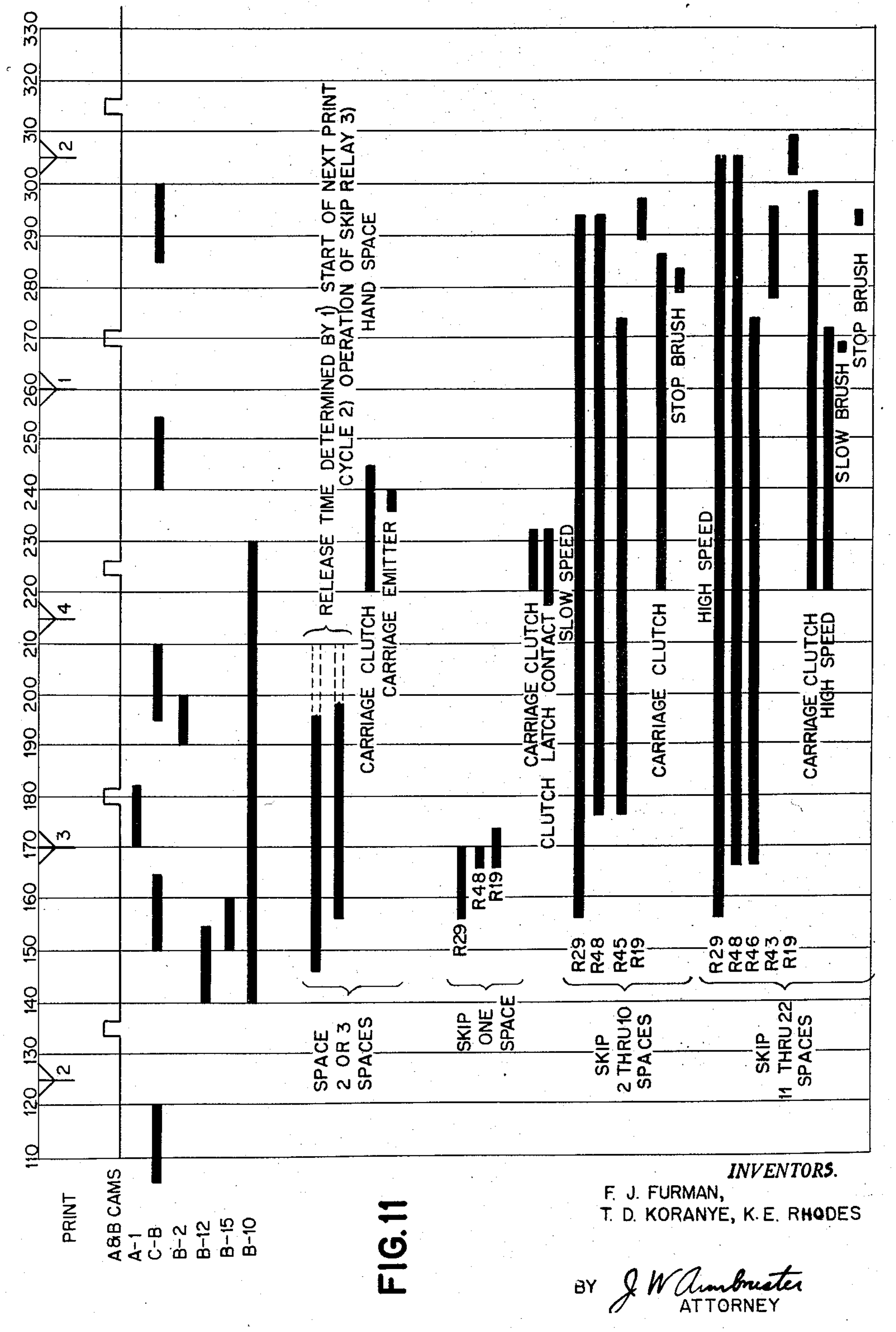

Fig. 11 is a timing chart showing the sequence of operation of the controls cooperating with the printer and the paper feed devices.

Figs. 12*a* to 12*e* when taken together form a wiring diagram showing the electrical and electronic controls for the feeding devices.

The main framework portions of the feed unit are best shown in Fig. 2 and 8. In Fig. 8 is is seen that the base comprises a heavy casting 30 which is formed with four downwardly projecting legs 31 each of which is formed with a central opening through which two heavy shafts or extension slide rods 32 are fastened and project towards the right where they run into and through guide blocks 33 and 34 extending from the sides of the printer frame 36 which comprises side channels or heavy structural rails 27 and 28, Fig. 10. In other words, the two projecting rods extending from the bottom of the feed unit are secured thereto and are thrust movably into stationary bearings in the printer frame. It is on these two shafts that the entire feed unit rests and is retractable away from the normally closed and latched print receiving position where it is shown in Figs. 8 and 10.

Slidably mounted laterally on the top of casting 30 is another heavy casting 40 which is formed in the shape of an arch as seen in Fig. 2. This upper casting 40 rests loosely on the top of frame 30 but is keyed thereto as illustrated in Fig. 8 where it is seen that attached to the lower right end is an L-shaped member 41 which projects into a notch formed in the side wall of casting 30. At the lower left end, casting 40 is formed with a double shouldered extension 42 the lower part of which projects into a groove 43 and another groove 44 receives a projecting bar 45 which is attached to the top of a rearward extension 46 formed out of the rear of frame 30. An adjustable confining block 48 holds frame 40 forwardly positioned in groove 43. There is a manipulative means for adjusting the lateral shift of the carriage as a unit by shifting frame 40 relative to frame 30 as described hereinafter.

Turning again to consideration of the main framework of the carriage, it will be noted in Figs. 2, 6*a* and 6*b* that the main vertical side frames 50 and 51 of the feed unit are attached at the sides of frame casting 40 and spaced thereby to hold many of the feeding controls and the cross shafts between these main frames.

Attached to side frames 50 and 51 are a number of brackets for holding several sub-assemblies for different feed controls each of which is coordinated with the feeding devices in general. On the right side frame, Fig. 6*b*, there is a bracket 54 which serves to hold the magnetic brake housing MC which is in cooperation with the main tractor drive shaft 55. Attached to the inner face of the left side frame, Fig. 6*a*, is a bracket 56 for supporting the parts cooperating with a drive clutch. On the outside of frame 50 are a number of supporting devices including a bracket 57 for holding the differential drive gearing including the worm gearing for the vernier line adjustment device. Another form of bracket or auxiliary frame 58 is the support for the three sets of tape sensing brushes and the cooperating contact rollers and driving pin feed drum for operating the tape. A third frame 59 is supported by studs 60 and it projects to form bearings for receiving projecting shafts to hold certain of the drive gears. Extending across the paper feed unit are several shafts and bars which not only support feeding devices, but also act as stiffening means between the frames. One such shaft is the shaft 62 which is the mounting means for the upper pair of tractor feed devices. Another such device is the bar 63 which acts as the platen to support the record forms when they are receiving the blows of the print recording heads.

The printer with which the paper feed is illustrated is of the kind involving a wire printer operating in serial order at high speed and is set forth in detail in copending patent applications Serial Nos. 479,106 filed on December 31, 1954, and 479,107 filed on December 31, 1954.

In Fig. 2 it is seen that the feed devices are driven by a motor M which is fastened to the top of the upper casting 40. A blower B, Fig. 6*b*, keeps the motor cool. This motor M is of a special variable speed type which is disclosed more fully in the copending application Serial No. 476,655, filed on December 21, 1954, by W. F. Morgan. On the motor shaft is a pulley 66 for the main drive belt 67, Fig. 6*a*, which is of the inner toothed type or Gilmer timing belt form for a more positive drive to a toothed pulley wheel 68 loosely mounted on the drive shaft 69 but connected to a clutch drum 70. Through the action of the clutch control ratchets 71 and 72 and other parts, the drive of the continuously rotating drum 70 is at times communicated to the drive shaft 69 which extends to the left, Fig. 1, to the tape feeding pin wheel or drum 73 and a gear 74 which is the first of a train of gears in the drive.

The drive connections are not direct to the continuous strip advancement tractors but are made through two indirect connections for two main reasons. The first reason for indirection is to provide a planetary form of connection wherein vernier adjustments or slight variations may be made in record to printer relationship. And the second reason for the circumlocutionary drive is to provide means for a change from 6 to 8 lines per inch of spacing whenever closer printing is desired.

The drive continues from gear 74 and through a loose idler gear 76 which is in mesh with a gear 77 which is loose on line space adjustment shaft 78 but fastened to a hub 79 which also holds the loose continuously rotating part 80 of a toothed clutch 80—81 normally connected by the shifting action of a lever 82 which carries rollers 83 to open the clutch only on occasion for manual adjustment. The drive continues through clutch disk 81 which has on it a plate 84 with brackets 85, 86 and 87 carrying planetary driving connections. A worm gear 88 and a helical gear 89 are on a short common shaft 90 suspended between brackets 85 and 86. The former is in mesh with a worm wheel 91 fastened to shaft 78, and the latter is in mesh with a mating helical gear 92 which is fastened to a shaft 93 extending through bracket 87 and carrying a spur pinion 95 which rolls around a gear 96 on a tube 97 fastened to the vernier adjusting knob 98 but loose on shaft 78. The outer line space knob 99 is fastened to shaft 78.

The drive is ordinarily through the worm gear 88 which is not then rotated on its axis but instead swung around bodily with shaft 78 as the center and the helix of the worm as a drive tooth of the gear 91. In other words the drive is through clutch 80—81, frame 84, worm 88, worm wheel 91, shaft 78 and over to a gear 100 also fixed to shaft 78, and then on further in the driving train.

At this point it is well to note how a vernier adjustment or slight variation in the position of the record material is made relative to the printing line. The vernier knob 98 is turned one way or the other to lift or lower the paper relative to the printer. When the knob 98 is turned, the connected gear 96 is also turned and communicates movement to the meshing pinion 95. Since pinion 95 is on shaft 93 with the helical gear 92, the latter is revolved and rotates the associated gear 89 which in turn rotates the worm gear 88. This motion serves to vary the angular relationship between the plate 84 which is the holder for the worm gear 88 and the worm wheel 91 which is fastened to the feed driving shaft 78. The planetary arrangement including worm 88 remains in constant readiness for ordinary line spacing and skip feeding movement regardless of the relative adjustment through the vernier knob.

A frictional type of spring finger or detent 101 is fastened to the side of plate 84 and carried around with clutch member 81. This detent extends over into contact with the periphery of a line space detent plate 102 fastened to the side of clutch member 80 and formed with a series of regularly spaced notches into which a V-shaped extension of detent 101 projects and is located as the knob 99 is turned by hand for line space adjustment. Detent 101 snaps into notch after notch when the line space knob is adjusted, and this serves for definite limitation of the desired number of manipulated spaces.

For line space adjustment, the driving train of gears is operated directly by the outer knob 99. Prior to this, the lever 82 is operated to open clutch 80—81. The knob 99 is fastened to shaft 78 and there is direct communication of the rotation given the knob to the drive gear 100 at the other end of the shaft.

Figure 1:
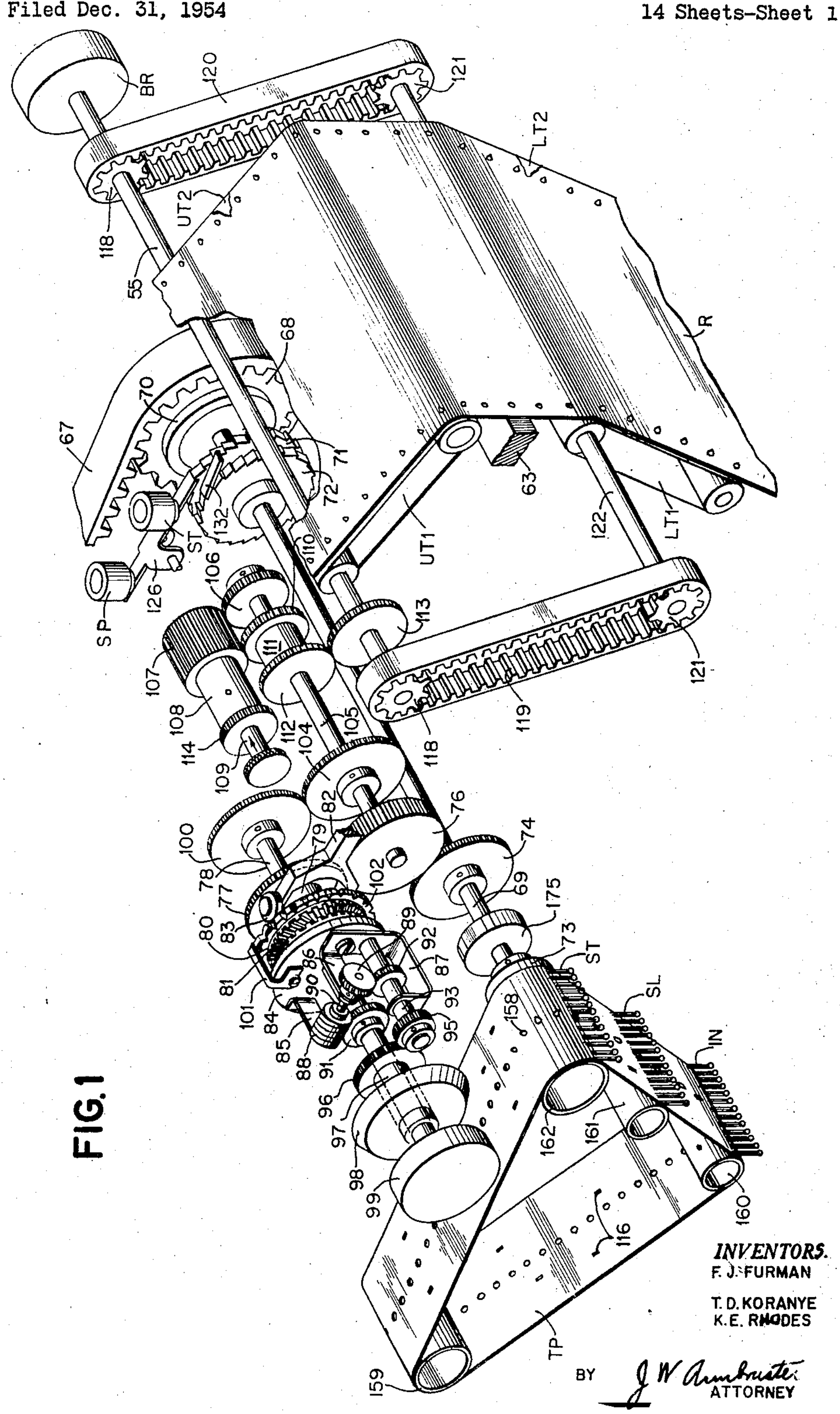
Fig. 1 is a perspective view showing the main components of the feeding device and the drive connections thereto.

Now that it has been seen how the driving motion is communicated indirectly from gear 74 to gear 100, Fig. 1, through the intermediate planetary adjustment devices; it is possible to trace the drive further. Gear 100 is seen to be in mesh with another gear 104 secured to the shaft 105 which is the axis for the idler 76 already mentioned. This shaft 105 projects towards the right and at that end carries another gear 106, which is fastened thereon and in mesh with a wide gear 107 fastened to a sleeve 108 slidably mounted on a shaft 109. Normally the wide gear 107 is positioned as shown to communicate the drive of gear 106 to another gear 110 which is loosely mounted on shaft 105 but connected to a collar 111 which also carries a slightly larger gear 112. Gear 112 meshes with gear 113 which is fastened to the shaft 55 already mentioned as being the driver for the two pairs of sprockets serving to actuate the pin feeding tractors. In other words, when wide gear 107 is positioned as shown, there is a rather direct communication of the driving motion through gears 106, 107, 110, 112, 113 and shaft 55. The driving connections mentioned are proportioned for spacing six lines to the inch on the record strip R adjusted by the feeding tractors. When it is desired to change the relationship so that the motion is reduced to get a greater number of lines per inch, then the gear 107, and a pinion 114 connected thereto through the sleeve 108, is shifted to the right to disengage the connection to gear 110 and instead to establish a more direct connection with gear 112. This is done to get a spacing of eight lines per inch. The drive connections then may be followed from gear 106 through gears 107, 114, 112, 113 and sprocket shaft 55.

The choice between 6 and 8 lines per inch of spacing is made by the operator and the gearing 107, 114 is shifted manually before the machine is brought into operation and, therefore, the relationship between the spacing of print on the continuous record form R and the related feed control tape TP may be selected in the usual fashion by proper spacing of the feed control perforations 116 in the tape.

Whenever the drive shaft 55 is rotated, the motion is communicated directly to the upper pair of pin feed tractors UT1 and UT2 which have extending pins mounted on chains to engage several of the marginal pin feed openings along the sides of all plies of the continuous record material R. The motion of the tractor pins upward serves to advance the material upward past the printing line which is coincident with the platen bar 63. In order to communicate the driving motion to the lower pair of feed tractors, the shaft 55 is provided with a pair of attached sprockets 118 onto which is drawn a pair of belts 119 and 120 for driving on opposite sides of the feed device. These belts 119 and 120 are of the positive type which are formed with inner toothed construction to cooperate with precise timing relationships with the driving sprockets 118 and a similar pair of sprockets 121 which are fastened near the ends of a shaft 122 which is the driver for the lower pair of pin feed tractors LT1 and LT2. These lower tractors also each have several pins engaging simultaneously in the marginal openings of the record material. Thus the four tractors serve not only to carry the record material rapidly away from the platen, but also help to bring the material out of the magazine and into print receiving position without tearing the marginal areas when operating at high speed.

In order to aid in slowing down the rapid advance of the record material and to aid in bringing it to a stop with gradual deceleration, the driving means is provided with a brake at the end of the main tractor drive shaft 55. The brake serves to reduce oscillations and rebounding of the feed parts after they are stopped and during printing. Thus paper shifting is avoided during the period of printing. On the right in Fig. 1 it is shown that the shaft projects into a brake unit BR. This brake construction is better shown in the right of Fig. 6*b* where it is noted that the bracket 54 on side frame 51 holds the stationary part of the brake unit. On the outer end of shaft 55 is secured the rotating disk 124 which is keyed thereon and is subject to axial movement when the interior coil MC of the brake is energized. The braking construction is similar to that shown in detail in the copending patent application of J. M. Cunningham et al., Serial No. 477,286, filed on December 23, 1954, now U. S. Patent No. 2,747,717.

Figures 3, 4, 5:
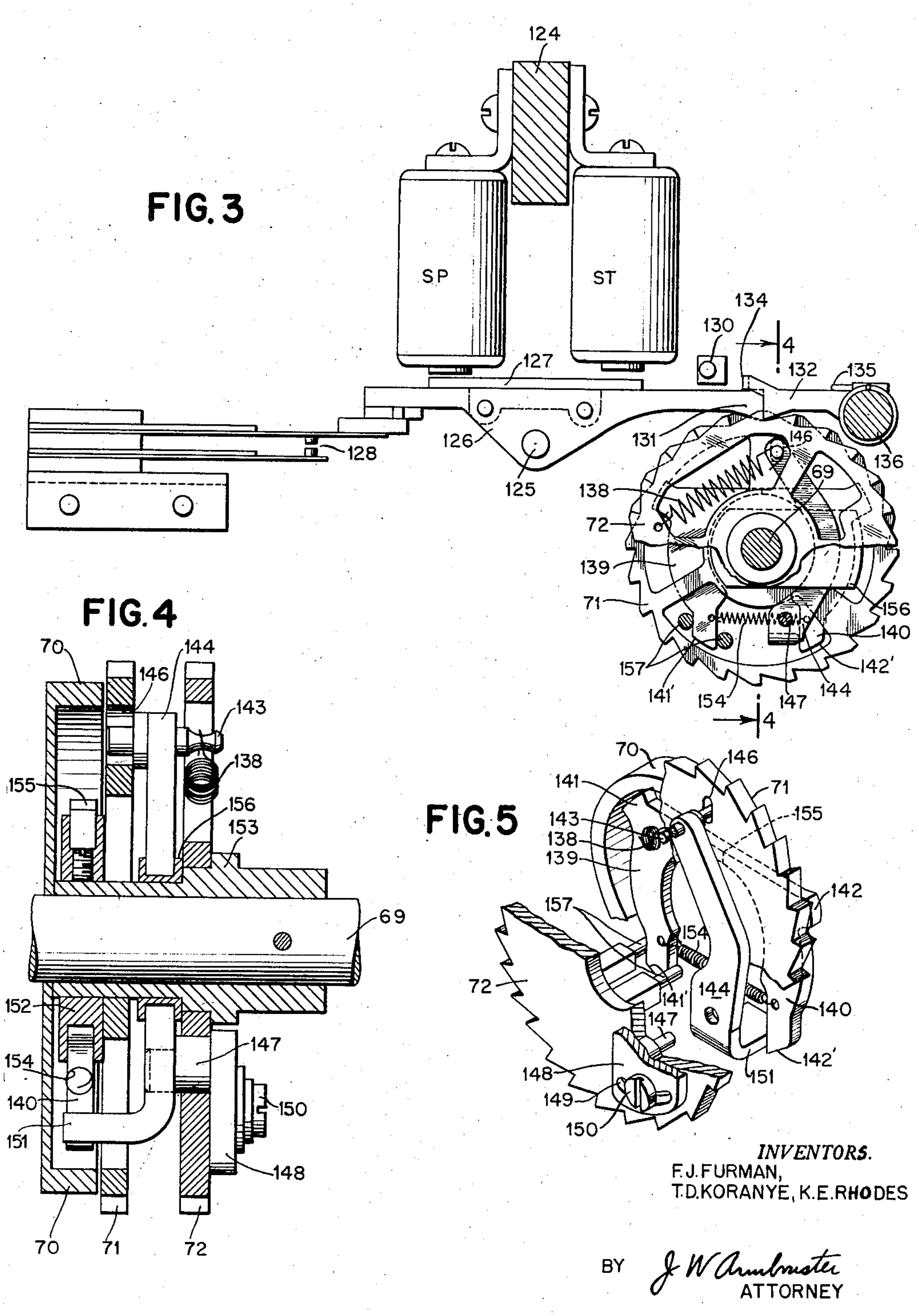
Fig. 3 is a side elevation view showing the random type clutch and the engaging and disengaging control magnets.
Fig. 4 is a sectional elevation view taken along line 4—4 in Fig. 3 and showing the interior construction of the clutch.
Fig. 5 is an exploded perspective view of the interior parts of the clutch showing the ratchet wheel control over the inner pry bar for engaging and disengaging the interior drive elements.

Now that the complete driving connections have been traced in a general way, it is believed advisable to return to consideration of how the main operating clutch 71—72 is constructed and controlled by the double coil start and stop magnets ST and SP. The parts for this clutch device are shown in Figs. 3, 4 and 5. It is pointed out hereinbefore that the left side frame 50, Fig. 6*a*, is provided with a bracket 56, and it is on this bracket that a bar 124, Fig. 3, extends to hold the pairs of coils constituting the start and stop magnets ST and SP for the clutch. Also extending from bracket 56 is a stud 125 which acts as the supporting means and axis for an armature pawl lever 126. The pivot 125 is centrally located on a line between the two control magnets. The armature plate 127 fastened to lever 126 is placed directly beneath the cores of the magnets on either side. When in the normal stopping control position, the lever 126 is rocked upward at the left by the stop control magnet SP and when operated for clutch engaging or starting control, the same assembly is rocked upwardly at the right in a counter-clockwise direction by the action of start magnet ST. A contact 128 is closed by counterclockwise motion of lever 126 whenever the start magnet ST is made effective. The rocking motion of lever 126 is limited by an adjustable stop stud 130.

At the right end of lever 126 there is formed a tooth shape 131 which cooperates with the ratchet teeth on the wheel 71 which is one of a pair of relatively movable ratchet control clutch wheels 71 and 72. The companion ratchet wheel 72 has teeth facing in the opposite direction and is normally engaged by a toothed clutch pawl 132 which is formed with a bent lug 134 overhanging the top of lever 126 to partake of its movement. A coil spring 135 is coiled around the pawl shaft 136 and tends to hold the pawl 132 down into engagement with the teeth of ratchet wheel 72 and prevent it from rotating in a clockwise direction. When the lever 126 is operated counterclockwise by energization of the start magnet ST, it not only lifts the tooth 131 away from ratchet wheel 71, but it also actuates pawl 132 through the lug 134 to disengage 132 from the teeth of the other wheel 72.

The object of releasing the two clutch wheels 71 and 72 is to allow the heavy spring 138 to operate and tend to draw together the two wheels in opposite directions a slight amount which serves to exercise an outward camming action on a pair of inner wedges or operating dogs 139 and 140 which have outwardly projecting fingers 141, 141[1] and 142, 142[1] for engaging the inner circular area of the hollow clutch drum 70. Spring 138 is at one end connected directly to the wheel 72 and at the other end it is connected to a stud 143 which projects through a camming member or pry bar 144 and also projects into a slot 146 cut into the other ratchet wheel 71. Member 144 is pivotally mounted on wheel 72 by means of an eccentric stud 147 which is adjustably rotated and locked into position by an attached plate 148 which is formed with an arcuate slot 149 through which projects a screw 150 to tighten the plate as adjusted. The position of the eccentric pin 147 is critical because the lower end of pry member 144 is formed with an overturned projection or operating piece 151 which contacts with the left side of the lower end of the clutch engaging member 140. The two dog or shoe members 139 and 140, Fig. 4, are loosely held in a container 152 which is secured to a bushing 153 fastened to the drive shaft 69 so that the two wedging shoes 139 and 140 are not provided with any fixed pivot but rather cling to the circular inner wall of ring 152 and are held in an inwardly clinging position by a weak spring 154. A similar grooved retainer 156 confines pry member 144 axially. The two wedging parts 139 and 140 are in an abutting engagement at the top as shown in Fig. 5 where the upper horizontal edges come together along the line 155. It is at this point 155 where the wedging members are rocked relatively to each other to in effect be spread out and cause the four fingers thereon 141 and 142 to come into firm engagement with the inner surface of the continuously rotating drum 70. The train of action may be followed by noting that release of the two ratchet wheels causes relative motion thereof with wheel 71 coming in a counterclockwise direction while wheel 72 moves slightly in a clockwise direction. The result is that member 144 through the action of the strong spring 138 is rocked slightly counterclockwise about pivot 147 and tends to pry wedging member 140 outward through the offset portion 151. The pry bar 144 forces the shoe 140 against the drum 70. Since the shoe 140 makes angular contact with the drum, it tends to slide along the inside surface of the drum. This tendency is restrained by the other finger 142 which is forced into contact with the inside surface of the drum. This contact is also angular, therefore, shoe 140 tends to slide along the inside surface of the drum but is restrained by the shoe 139 due to the abutting projections meeting at the line 155. This process is repeated for shoe 139 to bring the lower part or finger 141' into contact with the drum by forcing it outward while guided by the studs 157. With an arrangement of this type, the forces are gradually accumulated at the four spaced fingers to provide the proper build up of frictional forces to the required torque. Motion of the drum 70 is communicated from the drum through the two shoes and through the member 144 and studs 157 to the ratchet wheel 72 and attached bushing 153 and into the shaft 69 attached thereto. Then the clutch parts and shaft 69 are rotated in a counterclockwise direction as shown in Fig. 3 as long as the teeth 131 and 132 of the armature lever and pawl are held raised away from the ratchet wheels. However, as soon as the start magnet ST relinquishes control and the stop magnet SP is energized, the lever 126 is rocked in a clockwise direction and the two pawls are dropped into the ratchet teeth, whereupon tooth 131 stops the counterclockwise motion of wheel 71 and through the pin and slot connection 146, Fig. 5, operates member 144 to rock it in a clockwise direction and shift the lower end 151 to draw away from the lower end of wedging member 140 and thereby free the connecting parts from the drum 70 which continues to move in a counterclockwise direction, Fig. 3. As this disengaging operation takes place the other ratchet wheel 72 is carried along for a slight extent with one of the abutting teeth going beyond the left of pawl 132 but prevented from being retracted by the action of spring 138 because the pawl snaps into place before the wheel can move clockwise.

Although the various sections of the clutch parts have been referred to hereinbefore as upper and lower portions of the clutch members, it may be pointed out that the clutch parts are operable in all positions of rotation. In other words, the clutch is of the form known as a random engaging clutch wherein the parts have no fixed relationship relative to the driving drum, and the inner clutch parts are operated universally by outer engagement with any of the plurality of teeth on the ratchet wheels. For a high-speed device this is important because there is no necessity for any parts to return to a home position. The clutch is available to start from any position and to stop at any position. However, the ratchet teeth on the clutch wheels have a relationship with a line space movement of the drive connections, so that rapid operation of the start and stop magnets is productive of single line space movement. In order to produce such a rapid switch from the start to the stop operation, there is provided the latch contacts or clutch switch contacts 128 which are closed by lever 126 upon a slight counterclockwise start movement so that the clutch is barely released before contacts 128 are closed to call stop magnet SP into action for a single-space operation.

It is noted hereinbefore that a control tape TP is provided to furnish a flexible form of predetermined programming for locating the record forms with respect to the printing line so that heading print blocks, item print and total print are started and stopped wherever desired on the forms. There is a tape TP produced for each type of form and for the respective length of form. The tape TP as shown in Figs. 1, 2 and 6*a* is an endless paper band which is either equal in length to the related form or a multiple fraction of the form length in the cases of short forms. In Fig. 1 it is seen that the tape is a narrow paper band which is driven by the pin studded drum 73 with the pins 158 thereon cooperating with a central line of feed perforations punched in the tape. The tape is advanced in synchronism with the movement of the record strip R and describes a triangular path in moving around a sleeve 159 at the rear and then passing successively around contact rollers 160, 161 and 162, the latter being on the feed drum 73. The three contact rollers or cylinders 160, 161 and 162 are placed opposite three lines or sets of tape sensing brushes, interlock brushes IN, speed reducing or "slowdown" brushes SL and finally the upper set of stop brushes ST.

As shown in Fig. 6*a* the three sets of brushes and cooperating contact rollers are supported outside the left side frame on a separate small frame 58 fastened to frame 50 by extending studs and brackets. The drive shaft 69 extends through frame 58 and carries drum 73 which extends outwardly. The other two contact rollers 160 and 161 are supported at the inner end on bearings in the frame and project outwardly without support at the outer ends.

The tape TP, Fig. 2, is held taut by the holder for the rear sleeve 159 which comprises an arm 164 which is rocked to the proper angular position and secured to the side frame 50 by means of a nut and spring washer 165 acting on a hub of the arm. When it is desired to change the tape all that is necessary is to loosen the arm 164 and slip the tape outwardly over the four guide rollers, i. e., after all sensing brushes have been rocked out of cooperation with the tape. When a new tape is inserted, the arm is adjusted angularly to hold it taut.

In Fig. 2 is is also seen that the three lines or sets of tape sensing brushes are mounted in a separately movable frame 166 pivoted at 167 on a stud projecting from the frame 58. The frame 166 is in the form of channel with a U-shaped cross section and has side plates for confining the ends of insulation blocks 168, three of which are spaced between the frame side plates to hold the sets of sensing brushes. When frame 166 is in the operating position it closes the contacts of a switch 169 fastened to frame 58 and it is in this position that a latch 170 pivoted on the top of the frame catches over a square stud 171 extending outwardly from one of the main side frames 50. When it is desired to change the tape, the latch 170 is lifted and then the frame 166 rocks clockwise until it abuts against a stop rod 172. In so doing it opens the contacts of switch 169 and this prevents operation of the feeding devices while the mechanism is out of the proper position.

Referring to Fig. 6*a* it is seen that, in addition to the insulation block 168 for holding the line of brushes, there is also a comb-shaped insulation member 173 which confines each sensing brush to a particular path on the tape. These paths around the tape are also termed channels and it is in these channels where the tape feed control perforations are placed differentially to predetermined various stop and start positions related to positions on the continuous record forms R. It may be noted that in the comb formation of guide block 173 there are 13 notches, 6 on one side of the tape feed pins 158 and 7 on the other side. The extra position, or 7th position at the extreme right, is used for a common contact brush which carries current to or from the contact roller. The other 12 brush positions are used mainly for several skipping controls and one is reserved for overflow control.

Since the tape TP is moved in a counterclockwise path, Fig. 2, a perforation 116 therein in any channel passes in succession first under the related interlock brush IN at the bottom and next passes the slowdown brush SL in the middle and finally reaches the stop control brush ST at the top. Since the tape is moved along with the record strip R during line spacing operation, the particular tape perforation of a certain channel may be anywhere short of the stop position brushes when a skip is initiated related to that particular channel. It is by means of these spacings of the three brush sets relative to the tape that the controls are preconditioned before skipping is initiated by the presence or absence of controls initiated by the particular tape hole passing or not passing the two lower sets of brushes. For example, if a certain channel is selected and it is immediately determined that the particular tape hole has not already passed the related lower brush IN, it is known immediately that the skip is going to be more than 3⅔ inches in length and therefore necessitates both movement at high speed and the omission of at least two subcycles of printing actuation to allow time for this long movement. On the other hand, should the skip initiation find that brush IN has been activated but that related brush SL has not exercised any controls, then it is known that the tape control perforation stands between the two brushes and the skip involved is longer than nine line spaces but shorter than twenty line spaces. Therefore, the skip is to start at high speed and involve a shorter loss of printer time. Should a skip initiation find both lower controls activated, then that is a sign that the skip is to be a very short one involving less than nine line spaces and it is to proceed at slow speed and involve a still shorter loss interval of printer time or no loss at all.

At this point it is well to comment upon the effect that the card reading printer has over the feed devices because it is the printer which responds to the punched record card control and prints on the record form according to how many lines of heading data, item data and classes of totals are called for by a particular group or groups of control cards. The printer has group control devices, heading card control by X and no X punchings in the cards and program controls for various classes of items and totals such as minor, intermediate and major controls. These controls originating within the card reader and printer are productive of impulses which may be used selectively to control the spacing or long feed skipping operations of the record strip feeding devices.

The channels of the tape TP are selected by the record card controls in the printer. As the cards feed they are sensed not only to select the data to be printed, but also the disposition of such printing by placement on a form. In most instances the printer initiates feeding for line spacing or skipping and the tape controls effect stoppage as determined by the holes in the tape. The exception is the overflow control whereby the tape both initiates and stops an ejection of the record material from the end of one form to the top of the next form. Tape channel selection is pluggable and of selective control from a number of card controlled sources. It may come from X holes in heading cards, or digit selection holes in any card, or class of totals on total cycles, or by group changes without total printing. These forms of channel selection control are set forth at length in the Mills et al. Patent No. 2,531,885, issued on November 28, 1950. Other patents of the tape controlled feed device variety include Rabenda Patent No. 2,569,829 issued on October 2, 1951, Bakelaar et al. Patent No. 2,684,746 issued on July 27, 1954, and the Cunningham et al. patent application Serial No. 477,286, filed on December 23, 1954.

It will be noted hereinafter with reference to the wiring diagram that the feeding controls for double space, triple space "skip to 1," "skip to 2," etc. are all pluggable to receive control impulses from the card reader and printer. They take precedence over each other in the order mentioned with single line spacing dominating all. The "skip to" controls refer to the tape sensing brushes as they are picked up in successive order so that when the "skip to 5" control is plugged, it means that the fifth tape brush is to sense a tape perforation and control the stop magnets regardless of tape perforations in all lower channel positions. Ordinarly it is for only the advances of four or more spaces that skip stop perforation control is put in the tape to determine where a heading is to start, where item impressions are to start, or where a total impression is to be placed.

When there are too many related items to be recorded on one form it is necessary to put the overflow items on a second form. In such cases the end sensing brush or twelfth brush of the stop brush set, in cooperation with a perforation at the side of the tape, determines where the overflow skip is to start. Any predetermined position may be chosen as the last line of a form and the control tape punched in the twelfth channel at a corresponding position to initiate overflow skipping.

The feeding devices operate at two speeds which are governed by the control over the variable speed motor which is operable at a record movement speed of 75 inches per second for skips of more than nine line spaces, end at the slower speed of 25 inches per second for skips of less than nine line spaces. These changes of speed since they are not abrupt are smoothed out in a sort of harmonic motion change or gradual variation from high to low speed. The demand for high-speed operation is automatically called for by a skip when a tape control perforation fails to make evident the passage beyond the "slowdown" brushes SL at the time the skip is initiated.

The feeding devices are provided with line spacing controls for single, double and triple spacing. The selection of control is made by operation of pluggable controls described hereinafter with relation to the wiring diagram. A single space control is the normal operation and will take place invariably in conjunction with serial order printing unless the feed controls are signaled otherwise.

The line spacing controls involve the use of the commutator 175 best shown in Fig. 6*a* where it is seen to be connected to shaft 69 and placed near the outer face of the side frame 50. Cooperating with the commutator are four sensing brushes best shown in Fig. 2 where they are seen to project radially from an arcuate block of insulation 176 which is fastened to the outside of frame 50. In Fig. 6*a* it is noted that commutator 175 has a continuous metallic band in one area and a regular series of separate segments or metal inserts spaced apart the equivalent of three line spaces. Cooperating with the continuous commutator band is a common line space conducting brush LSC, Fig. 2. The other three brushes LS1, LS2, and LS3 are spaced apart with their operating ends touching the commutator where it has the separated segments. One of these three brushes is always active and in contact with a segment and it may be any one of the three. When one is in the active position the other two are spaced one and two spaces respectively away from other commutator segments. The wiring controls later considered in connection with the wiring diagram are flexible so that upon a demand from the printer for one line space, such a demand is communicated to the particular one of the three line space control brushes which happens to be on an active segment. The wiring connections serve to initiate a pair of impulses to activate the start and stop magnets of the random clutch to cause the shift of one line space which also moves the commutator segments to pass from one control brush to another. In the event of a setting for double line spacing, then the control is varied to embrace the brush which stands one space removed from a conductive communtator segment. The double space control then calls for a stop impuse derived from the secondary control brush source and this necessitates the movement of the commutator and all connected controls including the record to a position involving two successive brush sensing stations on the commutator. In this same fashion a triple line space selection requires the cooperation of a spaced pair of line space brushes involving the brush which is on a segment and brush twice removed, i. e., in a position which establishes contact only after two degrees of movement of the commutator and becomes effective for stopping after the spacing of three line spaces.

A device is provided for producing manually adjusted lateral movement of the record forms and the feed devices cooperating therewith by shifting the upper frame comprising the main side frames 50 and 51 and the arch-shaped casting 40, Fig. 2, relative to the heavy lower casting 30, Fig. 8. It is already noted hereinbefore that the upper portion is slidably arranged relative to the lower portion by means of the notched construction shown at the left in Fig. 8 and involving the projection 42 and the slotted formation 43 cut into the lower casting 30.

Attached to the rear boss 46 on casting 30 is a bracket block 178 with a threaded section through which passes a long screw 179, the end of which projects through the side frame 50, Fig. 6*a*, and carries pinned thereon a gear 180. In mesh with gear 180, Figs. 2 and 6*a*, is an idler gear 181 having in cooperation therewith a spring detent 182 which is formed with a V-shaped portion extending between the teeth of the gear Also meshing with idler 181 is a drive pinion 183 which is loosely mounted on a stud 184 extending from the side frame 50, and connected to the pinion is an adjustment disk 185 from which there projects a handle 186. When the handle 186 is grasped and rotated about the center 184, the train of gearing drives the screw 179 and since the screw is immovable axially between the side frames 50 and 51 it merely revolves therein, but the threaded connection to block 178, Fig. 8, causes the production of relative movement between the two main frames. In other words, the whole upper section of the feed unit is shifted laterally along the top of the lower frame 30 and in this way the sets of tractors and record strip R, Fig. 1, are shifted laterally with respect to the print heads of the printer. This form of adjustment makes it unnecessary to shift the four tractor units individually when it is merely a matter of centralizing or shifting the recording control generally. It is only when the form width is changed that a requirement is made to vary the positions of the feed tractors laterally.

An example is given in Fig. 7 of the construction of one of the pin feed tractor devices. This sectional showing also applies in general to the construction of the other three similar units. Assuming that the unit shown in Fig. 7 is a lower tractor unit LT1, then it is driven by shaft 122 and supported on shaft 223. The unit is built around a heavy block 188 which has an inner section of tubing 189 slidable on the guide shaft 223. Attached to one side of block 188 is a plate 190 which acts as a support for a cover, not shown. A bushing 191 on shaft 122 is supported by block 188 and loosely mounted with respect to plate 190 but guided thereby and keyed to the drive shaft 122 by a tapered slidable key 192. Secured on the bushing 191 is a sprocket 193 over which is drawn the chain 194, the regularly spaced links of which are formed with a U-shaped holder 195 having an extension 196 from which there projects a feeding pin 197. At the lower end the chain 194 is drawn around another sprocket 198 which has affixed thereon a stud 199 carrying one section or inner race of a ball bearing 200, the outer race of which is secured to the elongated frame portion 201 which is formed as part of block 188 and provides an elliptical form of support over which the projections 196 are slidable and which forms a sort of backing for the thin projections 196 carrying the feeding pins 197.

The tractors are provided with means for placing them axially along the shafts 122 and 223 and clamping them there as well as providing for their shift or removal whenever desired. The inner end of sleeve 189 is formed with a thread 202 and cooperating therewith is a threaded adjustment nut 204 which is loosely mounted on shaft 223 and formed with a cooperating thread and also with an inner shoulder 205 which confines a split ring 207 of nylon which is suitable to be wedged into the tapered formation 206 formed as a flared end of the sleeve 189. Thus the unit may be placed in any axial position along shaft 223 and then the nut 204 may be screwed down and tightened to cause the ring 207 to be biased into a wedging position against the flared formation 206 as forced by the shoulder 205.

The upper sleeve 191 also has a section of threading 209 for clamping the tapered key 192 against the shaft 55. Cooperating with this threaded section 209 is a nut 210 with an inner shoulder 211 passing behind the raised end formation of the key 192. For further confining the key and causing it to move with nut 210, there is secured on the outer face of the nut a circular plate 212 which has a restricted opening around shaft 122 and fastens in front of one end of the key. From the construction shown, it is evident that when the nut 210 is loosened, the key 192 is drawn along therewith to be pulled out of the key way in the sleeve 191 and shaft 122. However, when the nut is tightened in the other direction, the key is not only inserted, but also clamped towards the center of shaft 122 and held firmly in the driving position.

The lower tractor pair LT1 and LT2, Figs. 1 and 2, is shown in the backwardly tilted positions which they occupy when the feeding unit is in operation. However, when the entire feed unit is retracted by pulling it away from the printer, Fig. 8, and sliding the rods 32 in the printer blocks and over to the left, then the lower tractors assume a vertical position as shown dotted at the left. This is done to make the feed pins more accessible and to insure that the record strip stays on the pins until it is drawn taut across an adjustable guide cylinder 214 which is fastened across the inside of the printer frame. When brought to the right and into the operating position, the lower tractor LT1 is seen to be slanted to agree with the angle of a paper guide plate 215 which is secured to the feed unit casting 30. It also agrees in position with a straight line path from where the record curves around the guide cylinder 214. Therefore, the hinging or pivotal construction of the lower tractors about to be described is furnished for the purposes of affording automatic angular adjustment of the lower pin feed chains as mentioned.

The lower tractor drive shaft 122, Figs. 6*a* and 6*b*, passes through two rectangular blocks 217 and 218, one near the inner face of each side frame 50 and 51. The blocks are each pivoted on a bushing 219, Fig. 8, extending from the side frame and concentric with the shaft 122. Thus the two blocks 217 and 218 are pivotally mounted with respect to the axis of shaft 122 without putting any burden or torque on the shaft. Attached to the inside faces of the blocks are spring holders and cam plates 220 and 221 to which are connected springs 222 tending to pull the blocks to a vertical position. The two blocks carry between them a shaft 223 which is the supporting means for the lower tractors and corresponds to shaft 62 of the upper tractors. It is shaft 223 and the tractors thereon which are swung in and out of the vertical position when the holder blocks are rocked about the bearings 219.

As noted in Figs. 6*a*, 6*b* and 8, the lower ends of cam plates 220 and 221 extend downwardly an appreciable extent, the former being bent offset at 224 and the latter extending straight down. Both lower plate ends are in the path of an adjustment rod or shaft 225, Fig. 10, which extends across the printer frame. The arrangement is such that when the feed unit is pushed toward the printer to be latched thereon, the lower ends of plates 220, 221 strike against the side of shaft 225 and for the last inch or two automatically swing the lower tractor frame of blocks 217, 218 and shaft 223 back to the angular position shown in full lines in Fig. 8. The purpose of studs 227 is to properly position the lower tractors in line with the paper path. After the blocks 217 and 218 have struck the stops, further motion on the part of the plates 220 and 221 will cause the plates only to pivot about the shaft 223 against the force of the spring 222 and two other springs, not shown, attached to the studs on the blocks 217 and 218. The purpose of this differential movement is to absorb the effects of tolerances and adjustments of the carriage position for various paper thickness. In order to prevent the blocks 217 and 218 from swinging too far under the urging of springs 222 and going beyond the vertical position, an extending washer 228, Fig. 6*b*, is fastened on the front edge of frame 51 and projects to stop block 218 in the vertical position.

In order to detect a break in the record material, or the passage of the end of the continuous strip, there is provided a mechanical sensing finger or lever which ordinarily rides along the surface of the advancing record material and changes its position when there is a break or absence of the material. It is already noted with reference to Fig. 8 that there projects beyond the front of the base casting 30 of the paper feed unit, a sheet guide 215 extending across the feed unit front end position at an angle coinciding with the angle of the path of the record material. This guide 215 is a form of backing plate against which the record material rests and it is slotted vertically in one position opposite a detecting finger or sensing arm 230 attached to and rocking with a shaft 231, Fig. 10, which is carried by bearings in two large brackets 232 and 233 adjustably fastened on top of the rails 27 and 28 which are part of the printer frame. In other words when the feed unit and the printer are separated by retraction of the two along the heavy rods 32, the guide 215, Fig. 8, moves along with the feed unit, while the sensing lever 230 remains behind because it is mounted on part of the printer frame.

The shaft 231 extends beyond the bracket 232, Fig. 10, at the left and there it carries a bell crank lever 235 which is attached to the shaft and formed with a horizontal arm to which is attached one end of a spring 236 tending to rock it in a counter-clockwise direction, Fig. 8. The upper end of spring 236 is attached to an extension 237 fastened to bracket 232.

The vertical arm of crank 235 is threaded and there extends from it an adjustable screw, the head of which cooperates with the plunger of a micro switch 238. The switch is fastened to the side of bracket 232 along with the extension 237.

From the arrangement of the parts as shown in Fig. 8 it is evident that as long as one or more webs of paper are present between the guide 215 and the sensing lever 230 it remains positioned to the right with the micro switch open. However, upon the absence of paper for any reason, the lever 230 is then free to rock counter-clockwise into the opening in guide plate 215 under the urging of spring 236. When the lever is so moved, the bell crank 235 is moved along with the rocking shaft 231, and switch 238 is operated so that various controls in both the printer and feed unit may be signaled to cause stoppage or other control occasioned by the absence of record material.

Early in the specification it was pointed out how the feed unit is made retractable with respect to the printer by being slidable thereon through the heavy extending slide rods passing through the blocks fastened to the printer frame. Now it is appropriate to explain how the feed unit is latched to either of the positions, and the first one to be considered is the position wherein the feed unit is latched close to the printer and in position to receive printing impressions on the record material.

When the feed unit is pushed into cooperation with the printer and reaches the proper position, a pair of latches 240 and 242, Fig. 10, engage with shouldered latching plates 241 and 243 attached to the sides of the blocks 232 and 233 already mentioned as being forms of adjustable brackets secured to opposite sides of the printer frame. The latches 240 and 242 are pivotally mounted to swing in a horizontal plane from the pivots provided in the base casting 30 of the feed unit. The side view of one of such pivotal mountings is shown in Fig. 8 and there it is seen that a vertical shaft 245 passes through a pair of extending ears 246 and 247 formed on casting 30. Between ears 246 and 247 there is pinned to shaft 245 an operating arm casting 248 which is shown in section in Fig. 10 and there it is noted that it has attached to it an extending operating handle 249 with an opening 250 into which four fingers may be inserted to grasp the handle and swing it in a clockwise direction to disengage the latches 240 and 242. An adjustable stop 251 projects from handle portion 248 and limits the counter-clockwise position of the operating handle. Springs 252 tend to keep the latches rocked inward to the engaging positions.

The disengaging control of the single lever 249 is communicated from the left side latch 240, Fig. 10, to the other latch 242 by means of a pair of rods 254 and 255 extending across the bottom of the feed unit. This is done by attaching to the lower ends of the two vertical shafts 245, double ended levers 256 which are formed with holes to receive the ends of the rods 254 and 255 which are connected to the levers on the opposite shafts 245. In Fig. 10 it is seen that the rods cross near the center of the feed unit and this is done because it is necessary to reverse the direction of movement of the latch operating parts because the latches swing inwardly in opposite directions.

The latches are released by movement of the handle in a novel manner by a combination of movements involving the eccentricity of the pivot and a positive rotary actuator. The eccentric manner of mounting the latches on shafts 245 is illustrated at the right in Fig. 10 where it is seen that the portion of the shaft 245 passing through the pivoting end of latch 242 is formed circular with a ring or crank portion 258 which is eccentric with respect to the long shaft portion 245 connected therewith. This offset arrangement 258 is also shown in dotted lines in Fig. 8. With this kind of construction it is apparent that when lever 249, Fig. 10, is rocked clockwise, the eccentric mounting of both latches tends to rock forwardly and therefore the shouldered points of the latches are shifted forwardly to the partly open position as represented by the dotted line position 259 at the right in Fig. 10. In a converse fashion, when the feed unit is being assembled on the printer, the counterclockwise motion of the lever 249 will tend to draw backward on the latches and cause them to clamp tightly against the latch plate shoulders and thereby compress the soft bumper members or rubber washers 260 which are mounted on the slide rods 32 and presented between the abutting ends of the feed unit and printer unit castings.

However, it is not sufficient for withdrawal of the feed unit that the latches should be merely moved forward. It is necessary that they be rocked out of the path of the latch plates and this is performed by rocking means about to be described. Loosely pivoted on each shaft 245, Fig. 8, is an arm 262 which is on the same hub with the double ended lever 256 and located just under the latch 240. Arm 262 is formed with an upstanding lug or tab 253 which is keyed into a notch 257 in the eccentric portion 258 for ease of assembly and positive connection. This arm 262, Fig. 10, is also formed with an upwardly positioned extension 263 on which there is an adjustment screw 264. The screw end is in the path of a projection 265 formed on the latch 240 near the pivot. A similar arrangement of lever 262, screw 264 and extension 265 is associated with the other latch 242 shown at the right in Fig. 10. After the lever 249 has rocked the eccentrics 258 through about 90 degrees of movement, the screw 264 on lever 262 then comes into an abutting relation with the extension 265 on the latch to swing the latch. The ensuing movement is represented at the right in Fig. 10 where it is seen that the second degree of movement of latch 242 is represented by the dotted line 267 showing the position of the latch after it has been operated both longitudinally and with rotation. Therefore the operation of the lever 249 through a swinging motion of about 90 degrees causes the latches to not only be retracted, but also rocked out of the path of the latch plates so that the paper feed unit is disengaged and free to be retracted.

The carriage latch is so arranged that the natural unlatching movement of the latch handle from right to left (Fig. 8) corresponds with the required carriage movement from right to left when opening. The carriage may be closed against the printer, regardless of the position of the latch handle without danger of damage to the latch.

Rejoining of the feed unit carriage to the printer is also a simple operation. When the lever 249 is rocked back near the home position the first thing that happens is that the springs 252 cause the latches to follow along after the arms 262 and the latches move inward ready for locking action. Then the two units may be brought together and finally the lever 249 operated to bring it to a closed position against the side frame of the feed unit and in so doing the latches are drawn backward and the two units are joined firmly with a clamping action exercising pressure on the bumpers.

In order to compensate for various thicknesses of the record material which may be comprised of one or more layers of continuous forms and carbon strips, there is provided a means for varying the joining position of the feed unit on the printer. This is done by shifting the latch plates 241, 243, Fig. 10, so that the feed unit is held in a position allowing room for a variable number of strips between the ribbon of the printer and the platen bar 63 of the feed unit. In order to shift the position of the latch plates, the blocks 232 and 233 upon which they are mounted are shifted by eccentric portions such as section 269 shown as formed near one end of shaft 225 and passing through a block 270 which is held in a U-shaped opening in the top of block 232. Although the parts will be described with reference to the sectional showing at the lower left hand corner of Fig. 10, it will be realized that the construction is duplicated at the opposite end of shaft 225 to shift the two latch plates in synchronism.

Turning again to the manner in which shaft 225 governs the thickness adjustment, it will be noted that this shaft is mounted in adjustable eccentric bushings 281 near either end, said bushings being in the vertical walls of a pair of stationary brackets 271 and 272 secured to the top of the base frame 29 of the printer unit. These eccentrics 281 are separately adjusted for an askew correction which is in addition to the common thickness adjustment control of shaft 225. The shaft ends project beyond bushings 281 with two eccentric portions such as portion 269 which passes through the notch opening of the adjustable blocks 232 and 233. Each of these blocks is held on a printer base by three large screws 273 which pass through slots in the brackets 232 and 233. When it is proposed to make an adjustment, the blocks 232 and 233 may be shifted longitudinally under the shouldered screws 273. Oversize holes are provided in these blocks to permit such movement. Blocks 232 and 233 are positioned and guided by strips 274' (Fig. 8) fastened to the printer frame which fit into slots in the bottom of these blocks running parallel to the support rods 32. The square blocks 270 which are formed with cylindrical openings through which the eccentric portions pass are seated in the U-shaped openings cut into the top of brackets 232 and 233, and these square blocks 270 are held over to one side and made readily removable by a clamping piece 274 which is pressed into position by an adjustable screw 275 which passes through the one side of the U-shaped opening and has a lock nut for holding it and the block 270 in position.

In order to twist shaft 225 to variable angular positions and thereby rotate the eccentrics to shift the latch blocks back or forth, there is secured to the left end of shaft 225, a manipulative knob 276 which extends beyond the left side of the printer. The extending portion of the shaft upon which the knob is fixed is supported in a detent block 277 which projects from a bracket 278 fastened to the rail 27 forming part of the printer frame. Near the ends of shaft 225 there are attached collars 279 for confining the shaft laterally. Detent block 277 has two diametrically opposite spring loaded ball detents projecting from its outer face against the inner face of the knob 276 which in turn has conical detent holes radially displaced therein so as to give controlled increments of spacing.

There are times when an adjustment other than the parallel motion provided by eccentrics 269 is required. Then the separate bushings 281 may be turned individually in the fixed brackets 271, 272 and in that way either end of shaft 225 and the corresponding latch plate may be shifted to align the platen with respect to all print heads. Another position maintaining device cooperates with the bracket blocks 232 and 233 in all positions. This other device forms a sort of prop between the feed unit and the printer unit and takes the form of the bolt 283, Fig. 10, which is threaded into one end of block 232 and provided with a lock nut for holding it in the adjusted position. The head of bolt 283 cooperates with a machined surface 284 cut into the side of the base casting 30 of the feed unit. The bolts 283 are adjustable in order to absorb tolerances in the carriage latch system. Thus the first operation is to adjust the stop bolts 283 so that the latch will draw up the carriage snugly against the printer and yet not require excessive handle pressure to latch. Once adjusted, readjustment of the bolts 283 is never required for changes in paper thickness or for skewed alignment of the platen.

It is explained hereinbefore how the feed unit is latched in place when it is in position to receive printing impressions. It is also required that the feed unit should be stopped and held in a certain position when it is retracted away from the printer unit. In other words, it is not enough merely to put enlarged portions on the ends of the sliding rods 32, but there should be some assurance that when the units are separated and the operator has her hands between them that they should not come together. In order to provide such a stop and latch arrangement for the retracted position, there is pivoted a swinging latch dog 288, Figs. 8 and 9, on the side of the printer unit and pivotally mounted on center 289 extending from the side of block 34. A compression spring 287 between block 34 and the inside surface of dog 288 tends to hold it in the angular position to which it is turned. Cooperating with this dog 288 is a latching member 290 fastened to the end of the slide rod 32 by nut 291. Latch member 290 is formed with a long upper section and has a cross-sectional area in the form of a reclining L-shape. The long upper portion of 290 normally slides over the top of dog 288, Fig. 8, which is normally positioned in a horizontal manner, as shown, and the retracting member 290 is unobstructed in the movement to the left until the small lower extension 292 strikes against the lower portion 293 of the dog and rocks it in a clockwise direction. Then the dog assumes the position shown in Fig. 9 where a pointed portion at the upper left corner of the dog is projected through a slot in the top portion of the member 290. Thus the retracting rod and member 290 are not only brought to a halt by the dog, but the dog 288 is also projected up into a latching position to prevent an immediate return movement of the feed unit. In order to impart a return movement of the feed unit to the closed position towards the printer, it is necessary to give the unit and the attached latching member 290 another short retracting movement to swing the dog 288 further clockwise to a vertical position in the slots, and then the feed unit is free for movement toward the right and in so doing again swings the dog 90 degrees more in a clockwise direction and back to the horizontal position of Fig. 8.

When the feed unit and the latching parts carried thereby are connected in the proper position ready to receive printing impressions, an indication is given that the printer may proceed to operate. This is done by the operation of a switch 295, the operating member of which is struck by the end of a slide rod 32 when the feed unit is properly assembled as shown in the lower righthand corner of Fig. 8.

Before considering the electrical and electronic controls of the record feeding devices, it is believed advisable to consider the timing of operation of the printer. Reference to the timing chart, Fig. 11, shows that the printer cycle, when considered with a printer of the serial order impression variety, is subdivided to provide time for the successive impressions to be interspersed between spacing operations. In the particular kind of printer used as an illustrative embodiment herewith the printing is effected by four successive impressions of the same printing head. These impressions are made side by side in the same printing line and adjacent to each other in consecutive order from left to right. Ordinarily after each set of four impressions there is a spacing operation followed by four other impressions from right to left. A sequence of eight print operations may be considered a full cycle which falls within 360 degrees of operation. As the chart indicates, for simple short spacing operations there is no loss of printer time because the printer after making one set of four impressions permits spacing to take place while preparations are in order for recording the next four sets of impressions. However, when a skipping operation of any length intrudes into the printing operation, some additional time must be allowed, but such time is not allotted here in units of a complete printing cycle. Instead, the time allowed is gaged in fractions of a printing cycle and only the required number of subcycle portions of time are given to permit full spacing operation before the printer starts another series of printing impressions. Therefore it is evident from the chart that the spacing between printer groupings of serial impressions is not a fixed interval but instead variable for several different subcycles of time in accordance with the demands of long skipping operations.

The wiring diagram shown in Figs. 12*a*–12*e* reveals wiring connections and the controls connected between the printer and the feed unit and also the connections between various components of the feed unit and its drive motor, so that the regulation of speed and stopping positions is coordinated between the control tape brushes, the clutches and the drive motor.

Figure 12A:
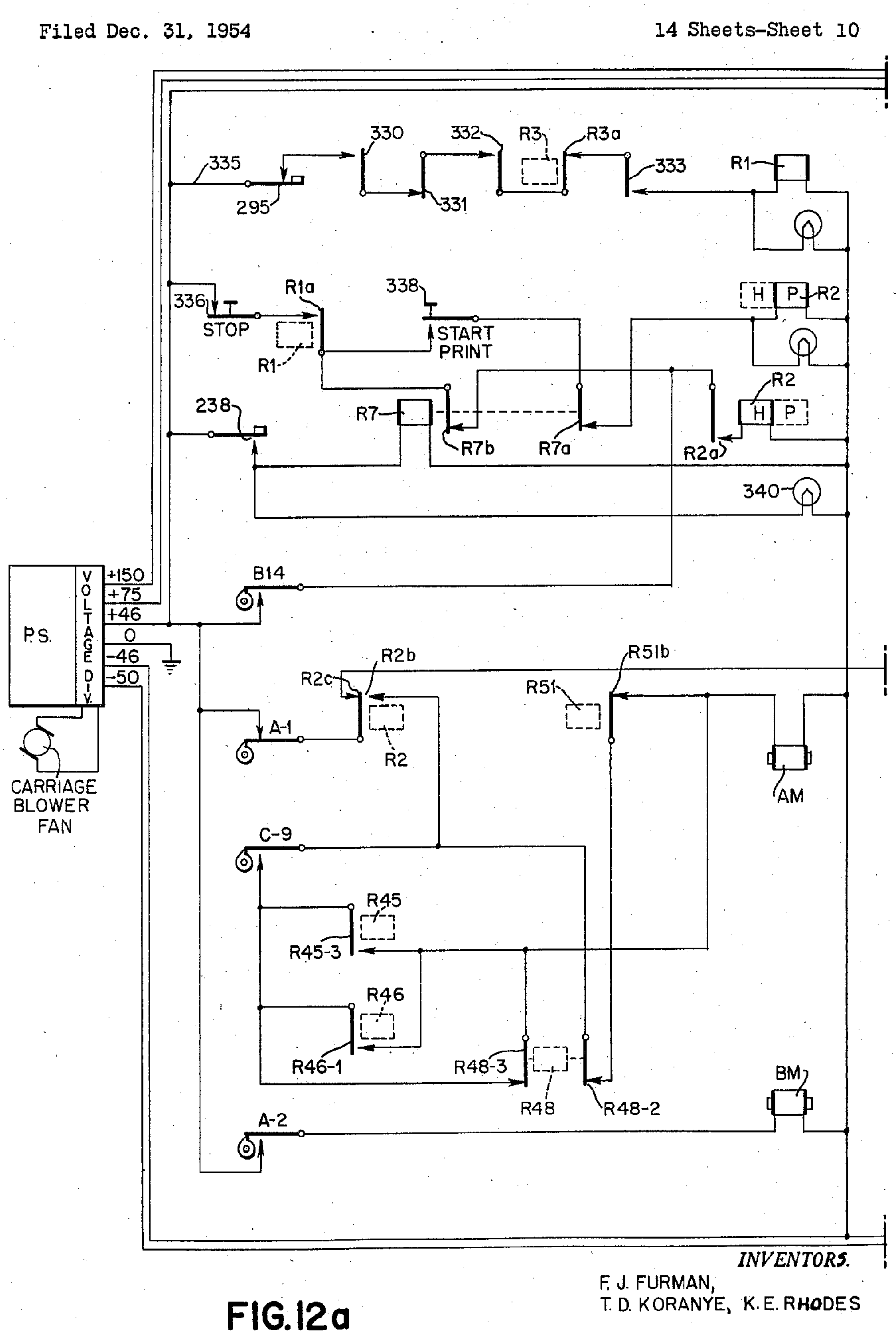
Figure 12B:
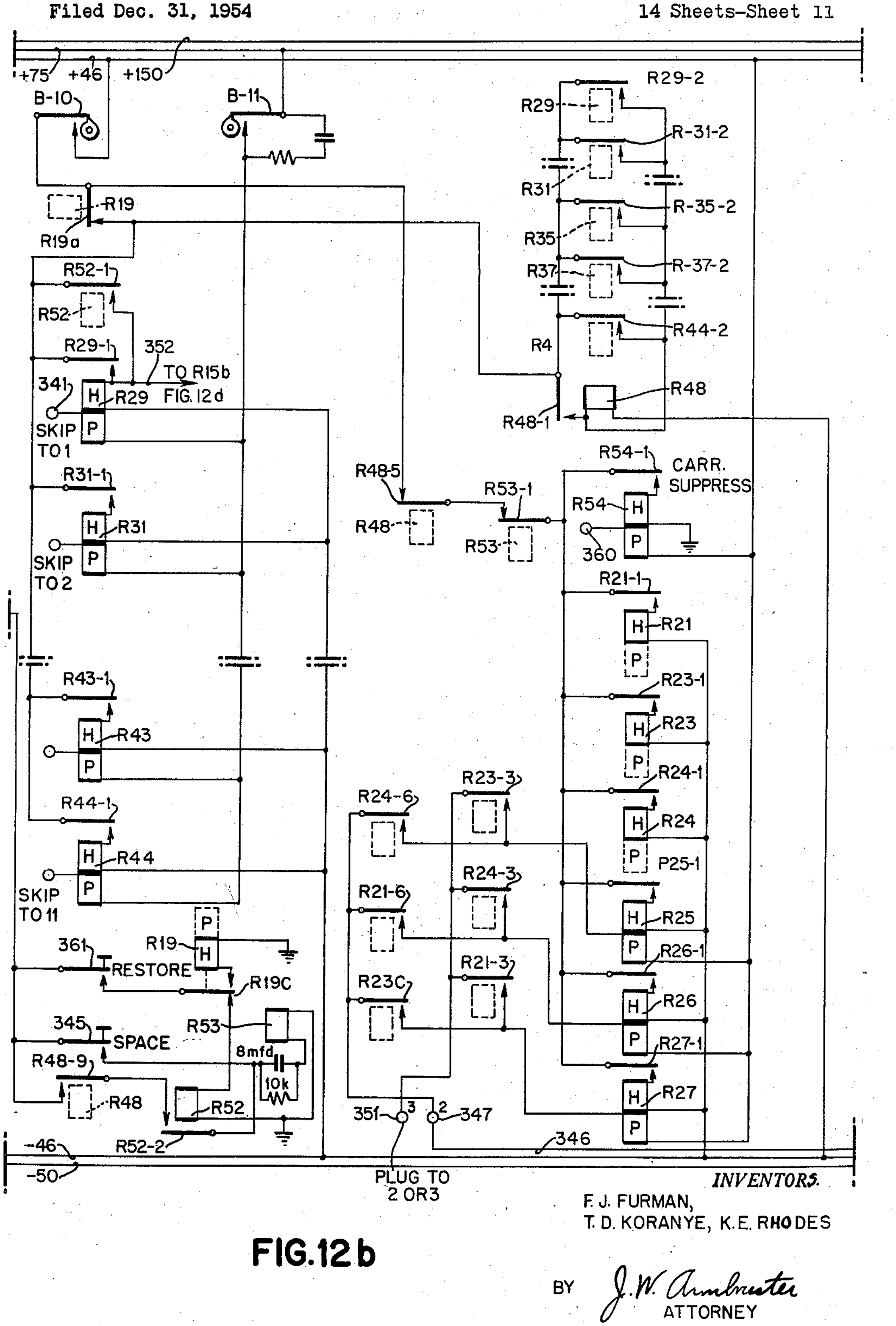
Figure 12C:
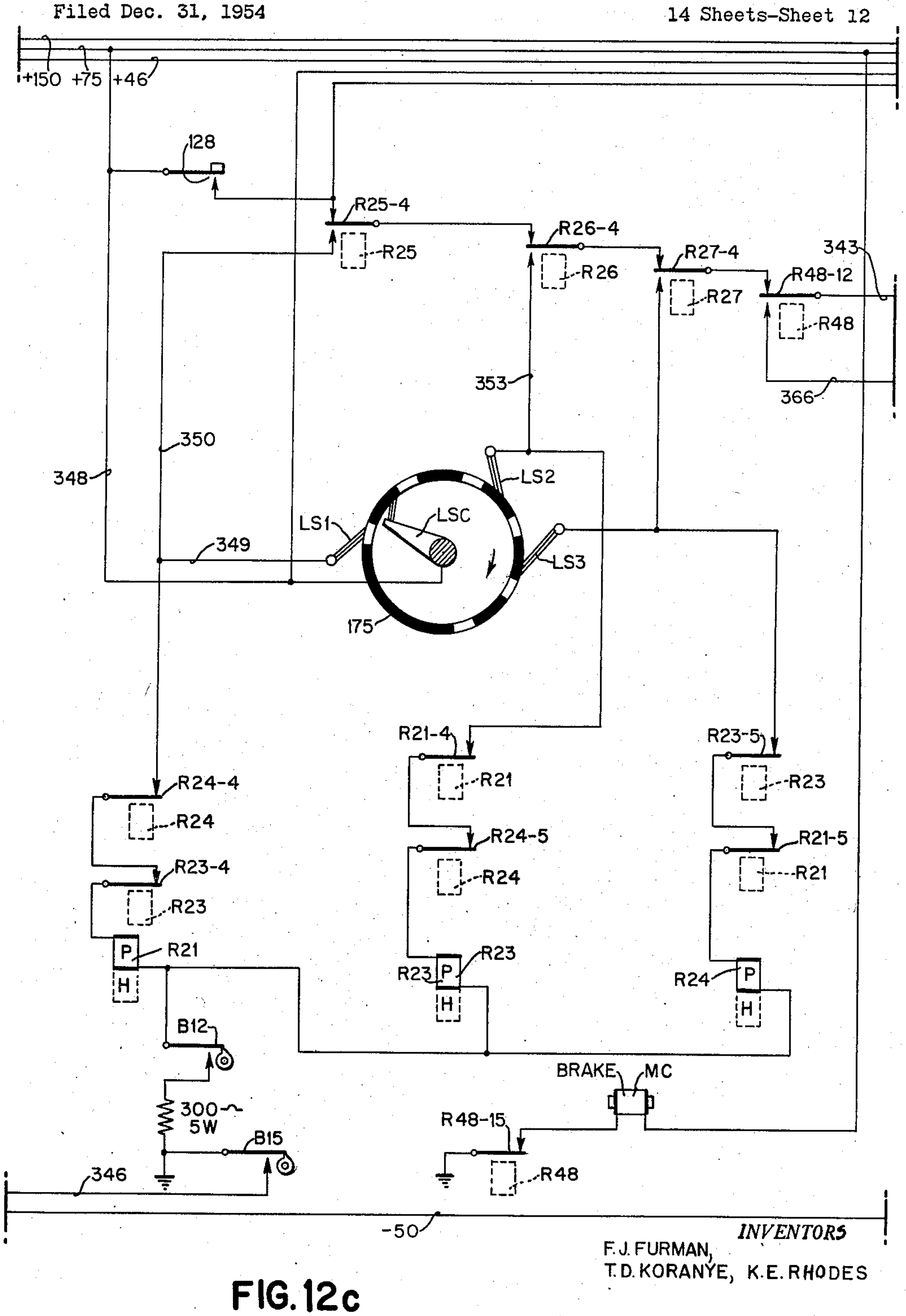
Figure 12D:
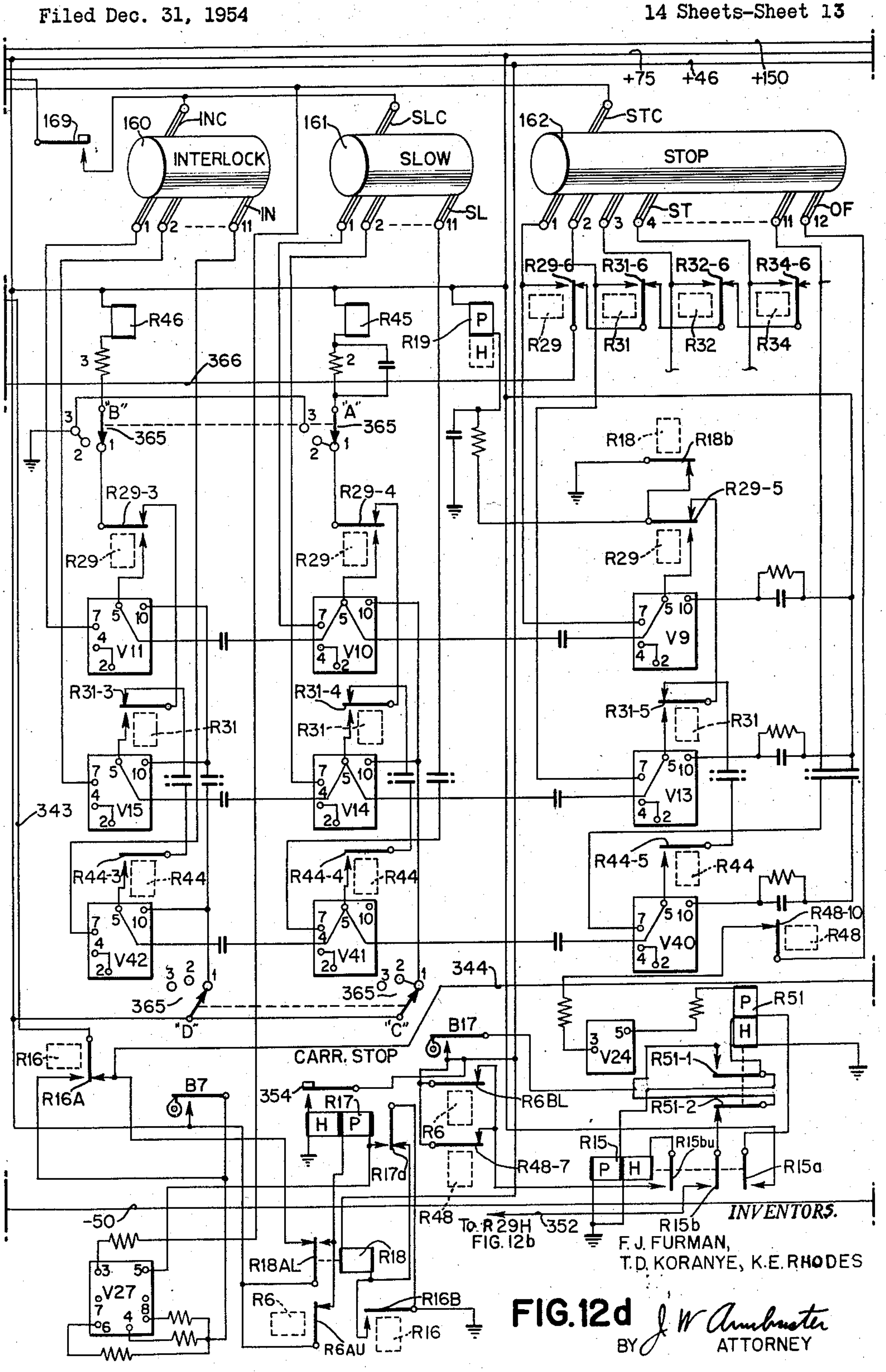
Figure 12E:
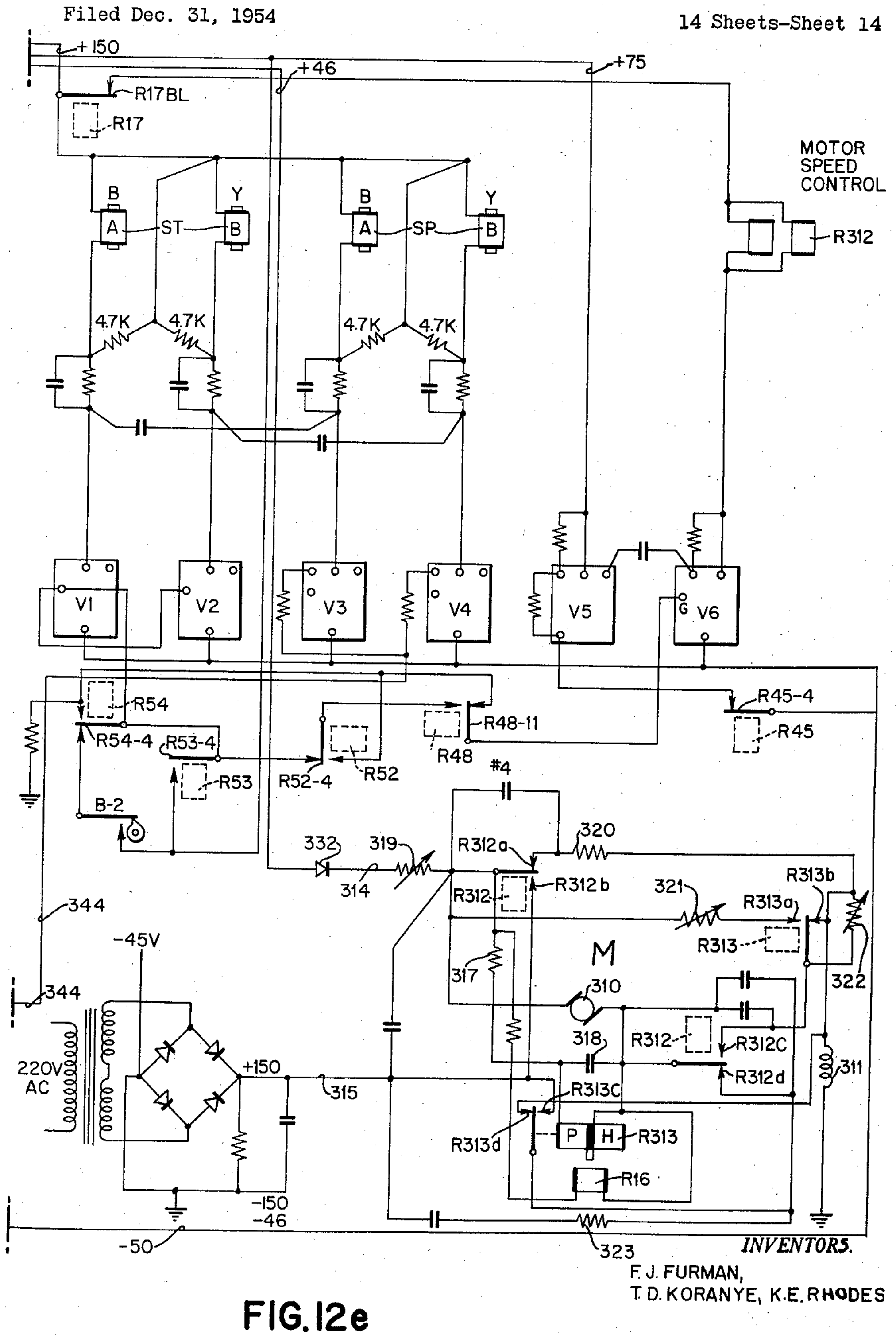

Referring to the bottom of Fig. 12*e* of the drawings, there is shown a feed driving motor M having an armature 310 and a field 311, relays R312 and R313, a relatively low positive potential source 314 and a relatively high positive potential source 315 having a common ground terminal and a number of capacitors and resistors. as shown, the motor controls are in the normal condition in which the motor operates at the first and lower of two predetermined speeds. When so conditioned, relays R312 and R313 are de-energized. Certain associated relay contacts of both relays are shown closed while others are opened, and then relay R312 (at the upper right corner) picks up upon the closing of contacts R48–11 which are actuated for any skipping operation involving feed in excess of nine line spaces. The closure of contacts R48–11 may be considered a first signal calling for the beginning of acceleration toward the higher speed. Subsequently, the opening of contacts R48–11 which causes the release of relay R312 may be designated as a second signal and serves to cause deceleration or braking to begin.

As shown, the coil of relay R313 is always connected in series with a resistor 317 across armature 310, but during low-speed operation, the voltage across the relay coil is too low to cause its pickup. Further delay for relay R313 is provided by the capacitor 318 in combination with resistor 317.

A resistor 319 is in series with low potential source 314 and adjusts the low speed of the motor. Another resistor 320 improves the low-speed regulation of the motor. Resistors 321 and 322 limit the second or high speed of the motor, and the latter provides close regulation of the second speed.

A rectifier element 332 is in series with the low potential source 314 to prevent current flow upon the closing of relay contacts R312*b*.

As explained in greater detail in the copending patent application, Serial No. 476,655, filed on December 21, 1954, by W. F. Morgan, the motor controls assume five different conditions, the first of which is at slow speed and arranged with the parts as shown in Fig. 12*e*. Thereafter, the contacts are so shifted as to produce in succession an accelerated condition, a top-speed-limiting condition, and first and second braking conditions.

In the first low-speed condition, the armature 310 and field 311 are connected in series with rectifier 332 and resistor 319 between the low potential source 314 and the ground because relay contacts R312*d* and R313*d* are in normally closed positions. With contacts R312*a* closed, resistor 320 is shunted across armature 310 to improve speed regulation. Adjustable resistor 319 provides means to adjust the speed of the motor to a desired first value.

When the feeding devices signal the demand for a skip feed of over nine line spaces, it is a sign that acceleration is to begin. Upon the closure of contacts R48–11, thyratron V6 and relay R312 are picked up, and contacts R312*b* and R312*c* are closed so that armature 310 and field 311 are connected through normally closed contacts R313*b* between the high potential source 315 and the ground. No resistors remain in the series path, and resistor 320 is made ineffective by the opening of contacts R312*a*. Accordingly, the motor rapidly accelerates from the first slow speed to the second high speed.

The relay R313 is brought into action at high speed to prevent the motor from exceeding a predetermined speed. Closure of contacts R313*a* puts the resistor 321 in shunt across armature 310. The opening of contacts R313*b* puts resistor 322 in series with armature 310 and field 311. Both resistors act to limit the speed and adjustable resistor 322 provides adjustment.

When the tape sensing brushes of the second set sense that the record is within nine line spaces of the stopping point, electrical connections are made resulting in the picking up of relay R45 and the opening of R45–4 to take off the bias supply and thyratron V5 goes on and as a result the connected thyratron V6 is extinguished and the connected relay R312 is deenergized, and this is the second signal calling for the beginning of braking due to the release of relay R312. Relay R312 is designed to open its contacts R312*b* and R312*c* disconnecting armature 310 from the high potential source 315 at a time shortly before contacts **312*a* and 312*d* close. A voltage is generated across armature 310 having a polarity so that current continues to flow through resistor 317** and a coil of relay R313 in the same direction. Therefore, relay R313 remains energized and its contacts R313*a* and R313*c* remain closed for the first phase of the braking operation.

The second phase of braking begins with closing of contacts R312*a* and R312*d*. Armature 310 and field 311 are now in series with resistor 320 between the source 315 and the ground. Resistors 321 and 322 are shunted across resistor 320. The armature is then connected with the opposite polarity. Accordingly, a relatively large but limited current flows through armature 310 in the opposite direction from the previous flow, and the motor develops torque in the opposite direction and is rapidly decelerated.

As the armature slows down, the generated voltage decreases until insufficient to hold relay R313 picked up. When the relay contacts return to the normal condition, the contacts R313*b* and R313*d* close and complete the original low-speed circuit.

The wiring diagram, Figs. 12*a*–12*e*, is shown in five sections relating in general to different parts of the feed unit electrical controls as they are related to the printer. Fig. 12*a* shows many of the controls in the printer. Fig. 12*b* shows the means for selecting skipping and line spacing controls. Fig. 12*c* shows the line space commutator and carriage stop devices. Fig. 12*d* shows the tape sensing brushes and the electronic controls cooperating therewith. Fig. 12*e* shows the connections to the start and stop magnets of the random clutch and the variable speed motor controls.

Turning to Fig. 12*a* first for consideration of how the printer is controlled and how the record feed unit influences such control, at the top of this figure, it is seen that there is a series interlock circuit involving a wire 335 from the plus 46 volt source, and this wire is part of a series circuit involving the feed unit contacts 295 which will be remembered as the contacts closed when the slide rods are fully inserted, showing that the feed unit is properly latched onto the printer. Other printer contacts 330—333 are in the same interlock circuit which energizes the relay coil R1 connected to the minus 46 volt source. Relay R1 is part of a readying apparatus which must be picked up from various sources to indicate that all connections are in readiness for operation of the printer. When relay R1 is picked up, it closes contacts R1–*a* in series with another readying relay R2. This secondary control circuit includes stop key contacts 336, relay contacts R1–*a*, start print contacts 338, and relay contacts R7–*a* normally closed. These connections all influence the pickup coil of relay R2. When the relay operates, it closes associated contacts R2–*a* in series with the hold coil and then the relay is sustained by either connections through wire 337 and relay contacts R7–*b*, or wire 339 and the cam contacts B14.

Contacts controlled by relay R2 are in series with one of a pair of clutch magnets for influencing the operation of the printer. These two printer clutch controls are identified as magnets AM and BM, and the former is for controlling a clutch with timing cams which are mostly of an electrical nature. The second magnet BM controls a clutch for connecting cams which are mainly of a mechanical nature for operating various trains of connections and also for operating the main printer drive shaft. The controls over these two clutch magnets AM and BM are arranged so that the former has precedence over the latter. In other words, magnet BM is only picked up as an aftermath of the operation of magnet AM. Therefore, it will be realized that by putting various electrical controls in circuit with magnet AM, the whole printer operation will be influenced.

A number of the feed unit controls for suspending or varying the operation of the printer are shown connected to influence the operation of printer clutch magnet AM. They are to be mentioned here only briefly and to be more fully explained hereinafter. The series circuit for energizing clutch magnet AM includes a pair of contacts R2–*b* which are operated to close under control of the ready magnet R2 already mentioned in connection with the preparing aspect of printer control. Also in series with AM are the normally closed cam contacts A1 and normally closed relay contacts R48–2 which relate to skipping control and are opened whenever a skipping operation is being performed by the feeding devices. Another control is that of the normally closed contacts R51*b* also a series connection which is opened during overflow skipping to suspend operation of the printer during form to form ejection.

Around the series circuit already mentioned in connection with magnet AM is a secondary series circuit involving the constantly moving cam shaft and cam contacts C9. This circuit has in parallel two relay contacts R45–3 and R46–1, the former being called in by the slowdown brushes of the tape sensing devices so that the printer is restarted in operation during the short slowdown period. The second pair of contacts R46–1 relate to a relay which is influenced by the interlock tape brushes which are engaged when a stop perforation is 3⅔ inches from the stop position and indicating that the record material is nearing the stopping point and preparations may be made for bringing the printer into operation. Contacts R46–1 provide this advance printer pickup control to magnet AM in conjunction with a shunt connection around them involving normally closed contacts R48–3 which relate to the relay R48 which is called into operation for all skipping functions. Therefore, when skipping causes R48–3 to open for a long skip which disables printer clutch magnet AM, there comes a time in the operation when the skip is within 3⅔ inches of being completed and then relay contacts R46–1 are closed to again start the printer moving through a series of steps which take long enough so that when record feeding has been terminated, the printer will be in full motion and ready to continue recording without loss of time.

The second printer clutch magnet BM is seen to be in series with cam contacts A2 which are operated whenever the first magnet AM engages to drive the cam contact shaft.

It is recalled that certain relay contacts R7*a* and R7*b* have some influence over the readying circuits of the printer, Fig. 12*a*. At the top of this figure it is shown that in series with the relay R7 are form controlled contacts 238 which are remembered to be controlled by a lever 230, Fig. 8, which detects the passage of the end of the record form. Should the record material break, or for any reason be torn or interrupted, the contacts 238, Fig. 12*a*, close and illuminate a warning light 340 and pick up the relay R7 which operates its contacts to break down the readying and running circuits of the printer.

In Fig. 12*d* it is seen that the three sets of tape sensing brushes IN, SL and ST cooperate with the respective contact rollers 160, 161 and 162 to control the feeding unit as determined by perforations in the twelve channels of the control tape TP. There are eleven brushes in each set plus a twelfth brush OF in the stop set of brushes ST, and this extra one is for overflow detection. The first eleven are selected according to the kind of stopping control it is desired to exercise under control of the record cards and the printer. Each of the eleven controls may very well have a differently arranged perforation to cause eleven different kinds of control and eleven different final stopping positions of the record material so that recording may start on different heading item and total lines. The means for selecting one or the other of the eleven controls are illustrated in Fig. 12*b*.

Along the left side of Fig. 12*b* it is seen that there are arranged from top to bottom a series of relays starting with relay R29 and continuing down to relay R44. These are termed "skip to" controls, and they are provided to afford eleven different electrical pickup means, one for each of the tape sensing channels and they are picked up to determine under which of the eleven brushes the record is to be skipped. At the upper left corner of Fig. 12*b*, it is seen that all skipping control is affected by the operation of cam contacts B10 and the normally closed relay contacts R19*a*. The last mentioned contacts are opened during stop control to disable all skipping operations.

The eleven "skip to" controls are similar in operation and arrangement so that a description of one applies to the others as well. The pickup coil of relay R29, which is controlling over the first channel of the tape sensing brushes, is seen to have connections to cam contacts B11 and to a plug socket 341 and plug connections are made to carry a pulse thereto representing some change in the card reader or printer machine. From the card it may be from an X hole or any digit selector, and then on the other hand, it may be derived from a group change or total taking operation. In any event, the impulse coming to socket 341 is an indication that a change in relationship of heading, item or total printing requires a demand for paper spacing to the control of the first channel which is usually devoted to skipping to the first heading line of the first heading. When relay R29 is picked up, it closes contacts R29–1 in series with the holding coil, and this coil is further sustained by cam contacts B10. Relay contacts R52–1 are arranged in shunt around R29—1 and they serve to select a "skip to 1" when a restore key is operated. Other connections through wire 352 are made to the holding coil of relay R29 to determine that an overflow skipping operation is to stop under "skip to 1" control.

Turning again to Fig. 12*d*, it is seen that relay R29 has three sets of contacts, one set in series with an individual one of each of the three sets of brushes to select one of the eleven in each case. These contacts R29–3, R29–4 and R29–5 are shifted to make effective the brush at the extreme left of each set. In a similar fashion, the other ten relays R31–R44, Fig. 12*b*, are effective to select other of the ten sets of brushes. These relays R29–R44 are not only effective in connection with the tape reading brushes, but they also operate any one of an entire parallel set of relay contacts R29–2, Fig. 12*b*, R31–2 etc., arranged in series with a common "all skips" relay R48. It will be remembered that this relay R48 has contacts in series with the printer clutch control magnet AM, Fig. 12*a*, and in a similar fashion it has controls in many places throughout the feed unit electrical devices to exercise control whenever skipping is or is not taking place. When a stop brush circuit is made, the thyratron V9 is fired and through contacts R29–5, relay R19 is picked up momentarily to break space and skip circuits, and in dropping out R29 it also opens R29–5 to extinguish V9 and de-energize R19.

Before considering further the tape controls and manual controls of the feed unit, it is believed best to point out how line spacing and form feeding are carried on. In Fig. 12*e* it is seen that when the printer cam contacts B2 close, a circuit is directed through the normally closed contacts R54–4 and R60–4 to the grids of the two start control thyratrons V1 and V2. These tubes fire and energize both coils of the start magnets ST of the random clutch. This operation of the magnets not only connects the tractor drive shafts to the driving motor, but they also operate the lever 126, Fig. 3, to close latch contacts 128 early in the spacing operation. These contacts 128, Fig. 12*c*, are seen to be part of a long stop control series circuit involving relay contacts R25–4 normally closed, R26–4, R27–4, R48–12 (closed until skipping takes precedence over spacing), wire 343 to normally closed relay contacts R16*a*, Fig. 12*d*, and wire 344 extending over to Fig. 12*e* and into the grids of the pair of thyratrons V3 and V4 in series with the pair of stop magnets SP for stopping the random clutch. When the tubes V3 and V4 fire, they not only call into operation the stop clutch magnets SP but they also cut off conduction in the other two tubes V1 and V2 related to the start clutch magnets ST and the same is true conversely. This rapid switching operation from control by the start clutch magnets to control by the stop clutch magnets is productive of one tooth space of movement on the random clutch and this is equivalent to one line space on the record form. When no other spacing or skipping function is called for, the single space skip is automatically effected.

There are also connections provided to effect a single line space operation manually. Depression of the space key shown at the lower left hand corner of Fig. 12*b* closes contacts 345 and causes relay R53 to pick up and then to drop out quickly as the condenser in series therewith charges and gives a uniformly short pulse to the grids of the spacing control magnets V1 and V2, Fig. 12*e*, because of the closure of relay contacts R53–4 arranged in shunt around contacts B2.

The machine may be plugged selectively to yield double or triple line spaces in connection with every spacing operation. This is done in conjunction with the commutator 175 and the four brushes cooperating therewith as shown in Fig. 2 and also illustrated in Fig. 12*c*. The commutator 175 is so constructed that for each single line space one or the other of the spaced three line space control brushes LS1, LS2 or LS3 rests on a commutator segment. Since the segments are spaced the equivalent of three line spaces apart (but joined in common contact to the common brush LSC) and the brushes are so spaced that only one brush makes at a time, during continuous normal single line spacing, the three brushes take turns in contacting the segments.

Assuming first that it is desired to obtain a double space, then the connection from cam contacts B15 is plugged to the double space selection plug socket 347, Fig. 12*b*. It is assumed further that the line space control brush LS1 is the one that is touching a segment when the double spacing operating is to be effected. In such a case, the corresponding relay R21, Fig. 12*c*, is then ready to be picked up over the circuit including wire 348, common brush LSC, commutator 175, brush LS1, wire 349, wire 350, normally closed contacts R24–4 and R23–4 pickup coil R21, cam contacts B12 made early in the cycle and further connections to the ground. The object is to stop the feed drive after cam contacts B2, Fig. 12*e*, have started it and after two line space movements have been performed, and this requires that the normally controlling random clutch latch contacts 128, Fig. 12*c*, be disconnected from the stop circuit to avoid single space short stops and in their place put relay contacts of relays R25, R26 or R27 to complete a stop circuit through the proper commutator line space control brush.

In preparing the proper stop circuit, cam contacts B12 close early in every cycle ahead of cam B2 and, in the present instance, serve to pick up relay R21 because brush LS1 is the one standing in contact making position. When relay R21 becomes effective, it closes contacts R21–1, Fig. 12*b*, and establishes a circuit through B10, the R21 holding coil and over to the minus 46 voltage line. It also operates contacts R21–4 and R21–5, Fig. 12*c*, to open the coil circuits of the other two relays R23 and R24. When the cam contact B15 makes ahead of contact B2, a circuit is completed through plug wire 346 to the double space hub 347, Fig. 12*b*, and through the contacts R21–6 to pick up relay R26 which is one of three space translation relays. At the top of Fig. 12*c*, it is seen that relay R26 then operates to shift contacts R26–4 to transfer the stop circuit to brush LS2 so that when the feed device is started and the commutator 175 moves, it rotates until brush LS2 hits a live segment, and in this instance a double space will result before the stopping control circuit is effective over the connections including wire 348, common brush LSC, commutator 175, brush LS2, wire 353, lower contacts R26–4, normally closed contacts R27–4, contacts R48–12, wire 343, Fig. 12*d*, contacts R16A, wire 344, Fig. 12*e*, and stop thyratrons V3 and V4.

It can be seen that the commutator brushes (Fig. 12*c*) serve a double purpose in that before the feed starts they set up the proper brush location relay (either R21, R23 or R24) through contacts B12, and in conjunction with the plugging from the carriage all cycles contacts B15 to either double space or triple space, the proper space selection relay is set up and then, after the feed unit has started, the brush selected by the space translation relay R25, R26 or R27 completes the stop circuit to the stop thyratrons.

It it obvious from inspection of the circuit that had the feed unit been conditioned with brush LS2 standing on a segment, then relay R27 would have been transferred, and with brush LS3 on a segment then relay R25 would have been transferred, causing a double space in each case. Therefore, the commutator brushes have a roving type of connection to be effective for similar controls in any of three conditions.

If the triple space hub 351, Fig. 12*b*, is connected to the carriage control cam contacts B15, then the selection of the space translation relays R25, R26 and R27 at the right in Fig. 12*b* would be altered according to the relay matrix to furnish a stop pulse after a third line space. Either double or triple line spacing can be called for at any time and in any sequence and all such spacing is performed at the slow rate of speed at twenty-five inches per second of record movement.

A number of B cam contacts have been mentioned hereinbefore and it is well to note that all cams for them are of the four lobed variety because of the serial printing nature of the printer, i. e., because recording is done in four steps along the print line. As shown in Fig. 11, the print cycle of 360° is devoted to eight print subcycles because in printing there are first four impressions made towards the right, followed by four impressions toward the left, before the print heads return to the first position.

Cam contact timing may be given with regard to the timing of the first lobe of each as follows:

| | | | |
|---|---|---|---|
| A1 | 350° | to | 6° |
| A2 | 18° | to | 48° |
| C9 | 18° | to | 36° |
| B2 | 15° | to | 27° |
| B7 | 350° | to | 2° |
| B10 | 36° | to | 86° |
| B11 | 358° | to | 48° |
| B12 | 15° | to | 40° |
| B14 | 60° | to | 100° |
| B15 | 24° | to | 40° |
| B17 | 9° | to | 25° |

The A and B cams repeat in operation every 90°. The C cam contacts although they are also of the four lobed variety operate twice as fast and repeat in every 45° to have the effect of an eight lobed cam.

In Fig. 11 it is also shown how the spacing and skipping operations involve a series of relay operations before the clutch and other controls come into play. Examples are given of a double line space, a single space skip, a skip of from two to ten spaces at slow speed, and a skip of from eleven to twenty-two spaces at high speed which is slowed down and stopped by successive operation of the slow and stop brushes. It will be noted that the clutch continues to hold the drive to carry one space beyond the stop brush position.

Consideration may be given again to the skipping operation in connection with the controls for tape sensing, most of which are shown in Fig. 12*d*. A standard form of perforated feed control tape TP is used and it is of the kind illustrated in the patents already mentioned. Referring to the top of Fig. 12*d*, it may be imagined that such a tape is drawn from left to right and successively under the brushes IN, SL, and ST. The spacing of these brushes relative to each other is arranged in accordance with the characteristics of the printer and the two speed motor because when brushes IN are spaced 3⅔ inches before brushes ST at the stop position, it is then possible for brushes IN to call into operation relay R46 and the contacts of this relay are shown in Fig. 12*a* in series with the clutch magnet AM of the printer which accordingly may be re-engaged to restart the printer after it has been suppressed because of a long feed operation. In other words, the time it takes for the paper to travel 3⅔ inches is the same time that it takes for the printer to be conditioned for continuing printing operation just as the record material is brought to a stop.

The spacing of the "slowdown" brushes SL, Fig. 12*d*, at nine line spaces from the stop brushes is also arranged so that the related slowdown relay R45 has the proper length of time to exercise control, Fig. 12*e*, over the motor speed control relay R312 so that the motor has sufficient time to change from high-speed to low-speed operation before the stop control is effective.

The final set of brushes which a feed control perforation encounters is the stop brush ST which operates through one of a series of thyratrons such as tube V9 to call into operation the relay R19 which releases all spacing and skipping controls after stopping is effected through relay contacts R48–12 and the stopping magnet SP of the random clutch. Tube V9 also extinguishes V10 and V11 to terminate all interlock and slowdown control of relays R46 and R45.

The carriage automatically selects the high speed action of seventy-five inches per second movement of the record material when the distance to the stop brush ST is ten spaces or more, and the speed selected is the slow speed of twenty-five inches per second when the skipping distance is smaller. The printer is designed for suppression or delay in increments of subcycle intervals. Each skip of any length introduces at least one subcycle delay. For a skip exceeding 3⅔ inches where more paper travel time is required, extra subcycle delays are introduced as needed. This variable delay is controlled by the feed control tape and the position of the selected feed control perforation because the printer restart is held off until an interlock brush IN, which is spaced 3⅔ inches away from the stopping position of the tape, gives the initiating pulse and operation of relay R46 for the restarting operation of the printer.

As the tape perforations pass the three brush stations, the related thyratrons such as V11, V10 and V9 are ignited successively and the connecting blowout condensers extinguish the thyratron ignited from the previous brush station. For example, if the first three tape channels are involved in skipping, and punchings appear in the tape in channels 1, 2 and 3 and a skip of four inches of fixed length is involved, each channel will have a perforation punched at four-inch intervals but in a staggered or biased relation to each other. Then each of the three tape perforations would have successive actuating effects upon its own set of three connected thyratrons, and these in turn would have successive effects upon relays R46, R45 and R19.

It is noted in Fig. 12*d* that a circuit switch 365 having four levers A–D is arranged in series with the interlock and slowdown circuits of the tape controls to make settings according to the length of the form which is to be handled. These switches have three selective positions so that for a form length in excess of 3⅔ inches, the carriage rotary switch is put on "1." When the length is between 3⅔ inches and nine line spaces, then the switch is put on position "2," and for form lengths of less than nine spaces, the switch is placed to make contact at position "3."

As the tape perforations pass the brush stations, each channel individually sets in storage the position of its "skip-to" distance by the related positional thyratrons. For example, if no skips are called for, but the record material is continuously spaced, the thyratrons for channel one would react as follows: First, the thyratron V11 is energized from the first interlock brush IN, and then, when V10 is energized from the slow brush SL, it puts out V11. As the tape moves on, the last thyratron V9 is energized from the first stop brush ST and puts out V10 and V9 also goes out. This cycle is repeated and a similar interchange of electronic control takes place for the other channels. The reason why such controls are provided is if at any time a "skip to 1" is called for and it is found that thyratron V11 is energized, this will energize the interlock relay R46 through the R29–3 point and it is instantly determined that the length to be skipped is less than 3⅔ inches and requires no extra lost subcycles and, at the same time, since relay R45 is deenergized, it is evident that a high speed starting operation is called for, and such operation will continue until R45 is picked up within nine line spaces of the stop position. The same sort of information is available for skipping control to any other channel and each one may differ from from the others.

Taking as an example a "skip to 1" operation involving a three inch skip, it is evident that the first thing done is by the signal from the printer or card reader and the picking up of relay R29, Fig. 12*b*, which in turn picks up relay R48 and both of them hold through the contacts R19*a* and the cam contacts B10. When the printer cam contacts B2, Fig. 12*e*, fire the tubes for start clutch operation as governed by thyratrons V1 and V2, they also operate tube V6 for the high-speed control of the motor relay R312. Since the skipping relay control contacts R48–12, Fig. 12*c*, are opened, they prevent the clutch latch contacts 128 from being effective for stopping control, and the tape continues to move with the brushes thereon, Fig. 12*d*, causing successive operation of the thyratrons V11, V10 and V9 and corresponding operation of the relays R46, R45 and R19, respectively.

As the tape perforation moves past the "slowdown" brushes SL, relay R45 will pick up and its contacts R45–4, Fig. 12*e*, will open to fire thyratron V5 and that causes the extinguishing of tube V6 so that the carriage motor is affected by the release of relay R312 to be shifted to slow speed. As the tape perforation reaches the stop brushes ST, the corresponding thyratron V9 is fired and a parallel circuit is set up through contacts R29–6, wire 366, and contacts R48–12 and connections to the stop control thyratrons V3 and V4. As the thyratron V9 is fired, the connected thyratron V10 is extinguished and the connected relay R19 is energized to open contacts R19*a*, Fig. 12*b*, and drop out the other two relays R29 and R48. Relay R29 then shifts its contacts on Fig. 12*d* which extinguish thyratron V9 and drop relay R19 to restore all the skip circuits to normal.

In connection with the line of stop brushes ST, the one brush in the twelfth position designated OF, Fig. 12*d*, is provided for overflow control and represents a special condition. Where the other brushes exercise stopping control, this causes starting control. The way it functions is by calling into operation the "skip to 1" controls, that is, those associated with relay R29. When there is an overflow of items from the end of one set, it is desired to continue to record them starting with the first line on the next form.

In Fig. 12*d* it is seen that brush OF is connected to the pickup coil of relay R51 through the normally closed skipping control contacts R48–10 and also involves a thyratron V24 and relay contacts R15*a* normally closed. The holding coil of relay R51 is arranged in parallel with the pickup coil of relay R15 and they are both made effective through cam contacts B17 which are closed after spacing is completed. There are two other controls which are exercised over overflow operation and they are performed through having an effect on the holding coil of relay R15. The one of these controls is exercised by a relay R6 which is in the printer and is arranged to indicate whether the printing devices are latched up or not. The related contacts R6*a* are arranged in parallel with skipping contacts R48–7 and this form of "and" circuit has influence over relay R15 so that overflow skipping is suspended until other skipping and other printer operation is suspended. When the conditions are fully satisfied for relay R15, and the overflow control relay R51 is effective, then a circuit is established to cause the picking up of relay R29 for a "skip to 1" operation. The circuit includes cam contacts B17 which close after previous spacing is completed and the circuit continues through contacts R51–2 and R15–*b* and a wire 352 connected to the holding coil of relay R29 as shown near the top of Fig. 12*b*. When relay R29 is called into operation in this fashion, it operates relay R48 and the skipping controls are effected just as though a selection was made for an ordinary "skip to 1" feeding operation.

The space key contacts 345, Fig. 12*b*, are wired to the normally closed contacts R2*c*, Fig. 12*a*, to provide current to relay R53 only at times when relay R2 is ineffective, i. e., at the times when the printer is not in operation.

At the bottom of Fig. 12*d*, there is shown a carriage stop key with contacts 354 which are operated manually when it is desired to bring the feed devices to a stop to prevent the piling up of record material which may be jammed or off the tractor feed. However, in effecting a stop of the feed devices, it is necessary to provide controls for preventing a stop at high speed. Therefore, control contacts of a relay R16 are wired in series with the stop key contacts 354 and this relay R16, Fig. 12*e*, is wired to the two speed motor in such a fashion that when the high speed control relay R313 is effective, the relay R16 in parallel therewith is also effective. There are two other relays R17 and R18, Fig. 12*d*, also operated in connection with the stopping operation and the former is provided to put the carriage drive in low speed (see contacts R17BL, Fig. 12*e*) if it is not already there and this is done by the key operation of relay R17 and subsequent release of relay R18 providing R16B (slow speed) and R17*a* are both opened together. The slowing action of R17 contributes in part to the firing of the stop control thyratron V27 which holds R18 until R16B opens at low speed. When the motor is operating at slow speed, relay R18 comes into action and sets up a stopping control circuit via the line 344 which runs to the grids of the stopping controls thyratrons V3 and V4. When relay R17 is operated, relay R18 will pick up and release provided that the contacts of relay R16 are opened indicating that the motor is finally at low speed. The circuit to the relay R18 involves the use of the thyratron V27 both grids of which are used to fire it by parallel "and" circuits. The one control comes from the latch contact 128, Fig. 12*c*, and the other comprises two branches the one involving cam contacts B7 which are made only while the printer is in operation. The other branch involving wire 357 comes from the normally open side of relay contacts R16 and regulates the control of the stop pulse to come only at a time when the high-speed motor is in the lowest speed so that conditions are favorable for key controlled termination of movement of the feed devices.

It is mentioned hereinbefore that slow-speed operation is controlled by the relay R312 shown at the upper right section of Fig. 12*e*. This relay is wired to be controlled by a thyratron V6 which is in turn controlled by another thyratron V5 wired indirectly to the minus 50 bias supply through the normally closed slowdown relay contacts R45–4. When these contacts are open by the tape control for slowdown operation, it takes off the bias supply and thyratron V5 goes on, while thyratron V6 is extinguished under control of the connected tube. With relay R312 so controlled, the motor speed is reduced promptly upon a signal from the slowdown controls of the tape.

At the top of Fig. 12*b* is seen that a pluggable control is provided to suppress operation of the feed unit under certain conditions. This is done by operation of a relay R54, the pickup coil of which is pluggable by connection to a socket 360. The holding coil for relay R54 is wired in series with a control which is also used for the line spacing translation release and it involves cam contacts B10 and skip relay contacts R48–5, and space relay contacts R53–1. Relay R54 has contacts R54–4, Fig. 12*e*, which are normally arranged closed in series with the start circuit of the feed unit clutch. When the carriage movement is to be suppressed, the operation of these contacts prevents start operation of the clutch and thereby prevents any movement of the record.

A manual control is provided to restore the record material to a starting position on a form from any preceding intermediate position. This is done by operation of the restore key shown at the lower left in Fig. 12*b* and it closes contacts 361 in series with a restore relay R52. In order to prevent repetitive operation should the key be held down, operation of relay R52 is made dependent upon the released control of relay R19 which is the operator for releasing all spacing and skipping controls under control of the stop brushes ST. However, when the relay R19 is de-energized to indicate that feeding may be performed, the related contacts R19*c* in series with relay R52 are closed, and the relay is then rendered effective to cause the feeding devices to take a "skip to 1" operation. On the same Fig. 12*b* with relay R52 is seen that it has contacts R52–2 in series with the space control relay R53 so that the connections for R53 are also picked up upon manual restoration as in a manual starting and spacing operation. It may be observed also that in series with the holding coil for the "skip to 1" relay R29, there is a pair of contacts R52-1 which serve to call into operation all the skipping controls necessary to effect motion of the record material to the first line position. Another control of this manual restoration relay may be observed in the middle of Fig. 12e where it is seen that the contacts R52-4 are normally closed in series with contacts R48-11 which are part of the high speed starting circuit connected to thyratron V6 for picking up the relay R312 to cause high speed carriage motor operation. By breaking this control, it is assured that the restoration by manual operation is made at slow speed.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine for operating on a record strip, a feed control tape with indicia for controlling the feeding of the strip, means for advancing such strip and said tape, a driving means, a pair of clutches between said driving means and said advancing means, one of said clutches being of the random engaging type and the other having a toothed construction for positive engagement, means for sensing said indicia, means under control of said sensing means for controlling said random clutch to engage and disengage said advancing means, a vernier strip-setting device on said other clutch for adjusting said strip relative to the printing line, and means for separating the toothed clutch before making a line adjustment.

2. In a machine for recording on a record strip, means for supporting said strip to receive recording impressions, a plurality of sets of tractor pin feeding devices cooperating with said strip, a driving means, a random engaging clutch between said driving means and said tractor feeding devices, a pair of electrical controls for operating said clutch, a feed control tape with indicia for controlling the feeding of said strip, means for sensing said indicia, and means under control of said sensing means for operating said electrical controls of said clutch to control the accurate positioning of said strip.

3. In a machine for printing on a continuous record strip having marginal feed control perforations, said strip being divided into forms, a platen, a plurality of sets of tractor pin feed devices cooperating with said strip to bring it to and away from said platen, an endless feed control tape of a length corresponding to the length of one of said strip forms, said tape having a continuous line of pin feed perforations and differentially located strip spacing control perforations, a sprocket wheel engaging said tape feed perforations to advance the tape, connections between said pin feed devices and said sprocket wheel to move them in synchronism, a driving means, a random engaging clutch between said driving means and said tractor devices, and means under control of said tape spacing control perforations for operating said clutch to start and stop said record strip and bring it to predetermined form positions.

4. In a device for advancing a continuous strip with marginal pin feed perforations, a platen, sets of tractor pin feed devices above and below said platen, drive connections between said sets of tractor devices and feeding devices cooperating with said driving connections to advance said strip intermittently and at variable speed, said feeding devices including a variable speed motor, a random engaging clutch, and speed changing means for selectively varying the drive of the motor in that interval during an advance movement of the strip by the random clutch, whereby an advance of the strip is carried on with a harmonic motion.

5. In a record feeding device, a driving means, a record advancing including a random clutch operable magnetically and start and stop magnets which operate the clutch, a commutator connected to said advancing means to rotate in unison therewith, said commutator having contact portions spaced around its periphery at intervals equivalent to three line spaces, means for establishing a continuous contact with said commutator, a series of three sensing brushes, one of said brushes contacting with a segment, a second brush being spaced away from a segment the equivalent of one line space of distance, and the third brush being spaced away from one of said segments a distance equal to two line spaces, all of said brushes cooperating with said commutator surface, means for preselecting the desired degree of line spacing for one, two or three line spaces between printing impressions, and connections between said preselecting means and said brushes whereby any one of the three is effective when contacting a segment for operating said clutch magnets rapidly and alternately for a rapid start and stop operation to limit the motion to one line space, said connections also flexibly choosing any one of said brushes standing one space removed from a segment when two spaces are desired and further choosing any one of said brushes standing two spaces removed from a segment when three line spaces are desired, all of said brushes serving individually and selectively to control the magnets for said clutch after certain intervals elapse between starting and stopping operation as determined by said preselecting means and the choice of a properly spaced brush.

6. In a machine for recording on a record strip formed with marginal pin feed openings, a platen for backing said strip to receive recording impressions, a pair of tractor pin feeding devices cooperating with such strip before it reaches the platen and another pair of tractors cooperating with the strip after it leaves said platen, a variable speed motor, a random engaging clutch between said motor and said tractor feeding devices, a brake cooperating with said tractors, a feed control tape with indicia for controlling the feeding of said strip, means for moving said tape in synchronism with the movement of said strip, means for sensing said indicia, and means under control of said sensing means for operating said motor and said clutch to control the speed and time of feeding and for operating said brake in conjunction with the slow speed operation of said motor to control the positioning of the strip.

7. In a machine for recording on a continuous strip divided into forms, recording devices, strip feeding devices, an endless member with indicia for feed control, means for sensing said indicia, a line spacing control commutator, sensing devices cooperating therewith for selecting single, double and triple line spacing control, electronic line spacing devices responding to said recording devices and said commutator sensing devices for controlling said strip feeding devices, a variable speed drive motor comprising a part of said strip feeding devices, a clutch comprising another part of said strip feeding devices, electronic skip feeding devices operated under control of said indicia sensing means and controlling said motor and clutch of said feeding devices, electronic overflow space controls operated under control of said indicia sensing means and controlling over said motor and said clutch to advance the strip at slow speed from form to form, electronic speed regulating devices cooperating with said motor under control of said indicia sensing means, electronic stopping control means operated under control of said indicia sensing means for terminating control over said feeding device operation by said motor and said clutch, and resetting means for reconditioning said electronic devices.

8. In a record feeding device, means for feeding the record, a commutator connected to operate in synchronism with said feeding means and to emit impulses at intervals of three line spaces, a set of three brushes cooperating with said commutator and spaced at intervals corresponding to one line space, electronic line spacing controls for said feeding means, means for flexibly selecting single, double or triple line spacing control in cooperation with said commutator sensing brushes, and means under control of said selecting means and said commutator brushes for pulsing said electronic controls to cause line spacing control.

9. In a record feeding device, record advancing means, a driving means, a mechanical clutch between said driving means and said advancing means, electronic start and stop controls for said clutch, a feed suppression key, and means under control of said key for disabling the electronic start controls of said clutch.

10. In a record feeding device, a record advancing means, a variable speed motor for driving said advancing means, means for controlling said motor and advancing means to space the record at low speed and skip feed the record at high speed, recording devices, a stop key, means under control of said key for conditioning said motor for slow speed operation before stopping, and other means under control of said key and said recording devices for stopping said advancing means when recording is complete.

11. In a device for feeding a strip divided into forms, a strip advancing means, a variable speed motor, means for recording, means for programming the arrangement of recorded items on a form, an overflow detecting means in the last mentioned means, an electronic device responding to the last mentioned means when there are too many items for one form, and means under control of said electronic means and cooperating with said advancing means, motor and recording means to skip from form to form at low speed and between recording operations.

References Cited in the file of this patent

UNITED STATES PATENTS 2,564,580 Pentecost et al. ---------- Aug. 14, 1951
2,684,746 Bakelaar et al. ---------- July 27, 1954